United States Patent [19]
Nater et al.

[11] 3,919,696

[45] Nov. 11, 1975

[54] MONITOR SYSTEM FOR SENSING DISCRETE POINTS

[75] Inventors: Robert A. Nater, Granada Hills; Charles E. Rolston, Santa Ana; Edward D. Hoover, Placentia; William F. Gunning, Los Altos Hills; Robert P. King, Anaheim, all of Calif.

[73] Assignee: Walt Disney Productions, Glendale, Calif.

[22] Filed: Dec. 10, 1973

[21] Appl. No.: 422,986

Related U.S. Application Data

[63] Continuation of Ser. No. 105,560, Jan. 11, 1971.

[52] U.S. Cl. .............................................. 340/172.5
[51] Int. Cl.² .............................................. G06F 3/04
[58] Field of Search .......................... 340/172.5, 147

[56] References Cited

UNITED STATES PATENTS

| | | | |
|---|---|---|---|
| 3,308,439 | 3/1967 | Tink et al. | 340/172.5 |
| 3,407,387 | 10/1968 | Looschen et al. | 340/172.5 |
| 3,432,813 | 3/1969 | Annunziata et al. | 340/172.5 |
| 3,596,256 | 7/1971 | Alpert et al. | 340/172.5 |
| 3,611,304 | 10/1971 | Hemdal | 340/172.5 |
| 3,611,311 | 10/1971 | Andrews | 340/172.5 |

*Primary Examiner*—Mark E. Nusbaum
*Attorney, Agent, or Firm*—Fulwider, Patton, Rieber, Lee & Utecht

[57] ABSTRACT

An apparatus system, including a programmed general purpose computer, for sensing the closed or opened state of large numbers of discrete points. The sensed points are placed in groups. System operation is initiated under control of the computer. Thereafter, the system interrogates each group of sensed points sequentially. During each group interrogation, all sensed points are first examined in parallel. If all sensed points are in a normal state, the following group is then interrogated. If any are in an off-normal state, each point in the group is scanned individually. An interrupt to the computer is then generated after which the computer takes action pursuant to stored error routines.

13 Claims, 4 Drawing Figures

INVENTORS
ROBERT A. NATER
CHARLES E. ROLSTON
EDWARD D. HOOVER
WILLIAM F. GUNNING
ROBERT P. KING
By Fulwider, Patton, Rieber, Lee, and Utecht
ATTORNEYS

MONITOR SYSTEM FOR SENSING DISCRETE POINTS

This is a continuation of application Ser. No. 105,560, filed Jan. 11, 1971.

CROSS-REFERENCE TO RELATED APPLICATIONS

This application contains disclosure in common with or related to that of two other applications filed on the same date herewith: Digital Animation Apparatus and Methods, Ser. No. 105,597, filed Jan. 11, 1971, now U.S. Pat. No. 3,767,901; and, Method of Indexing and Arranging Data in Storage, Ser. No. 101,455, filed Jan. 11, 1971, now abandoned. The additional disclosure of those applications is relied upon as disclosure herein.

BACKGROUND OF THE INVENTION

This invention relates to discrete monitor systems, and, more particularly, to systems for sensing the on or off state of large numbers of discrete devices such as switches. A programmed general purpose digital computer is used as part of the system to monitor, on a repetitive and continuous basis, any aspect of any other system or process which can be expressed in terms of on-off devices. An example of the type of system which may be monitored by the system disclosed and claimed herein is set forth in the co-pending application described above, entitled Digital Animation Apparatus and Methods. When an off-normal discrete condition is sensed, the computer is notified and controls a response determined by previously stored subroutines.

It is common for many controlled systems and processes to include numerous devices which must operate at certain times or in a particular way. Quite often, it is necessary to continually monitor such devices to insure proper operation of the system as a whole. Generally, operation of many such system or process aspects may be expressed in terms of discrete or on-off devices. Obviously, it would be a very considerable, if not impossible, problem to manually monitor operation of a system in which the monitored aspects would total dozens or even thousands. This invention provides means and methods of monitoring such systems on a continuous and repetitive basis.

SUMMARY OF THE INVENTION

In this invention, the state of many thousands of discrete points may be continuously and repetitively monitored. The points to be monitored are arranged in groups. All points in a group are first scanned in parallel. If an off-normal status of one or more points is sensed, each point is then scanned individually. The computer is notified of an off-normal status and the identity of the point or points involved. The computer then responds with a controlled output determined by previously stored subroutines. The computer is not involved in the operation of the scanning unless an off-normal condition is sensed. This results in a saving of computer time over prior art discrete monitor systems.

BRIEF DESCRIPTION OF THE PREFERRED EMBODIMENT

Introduction

Figure 1:
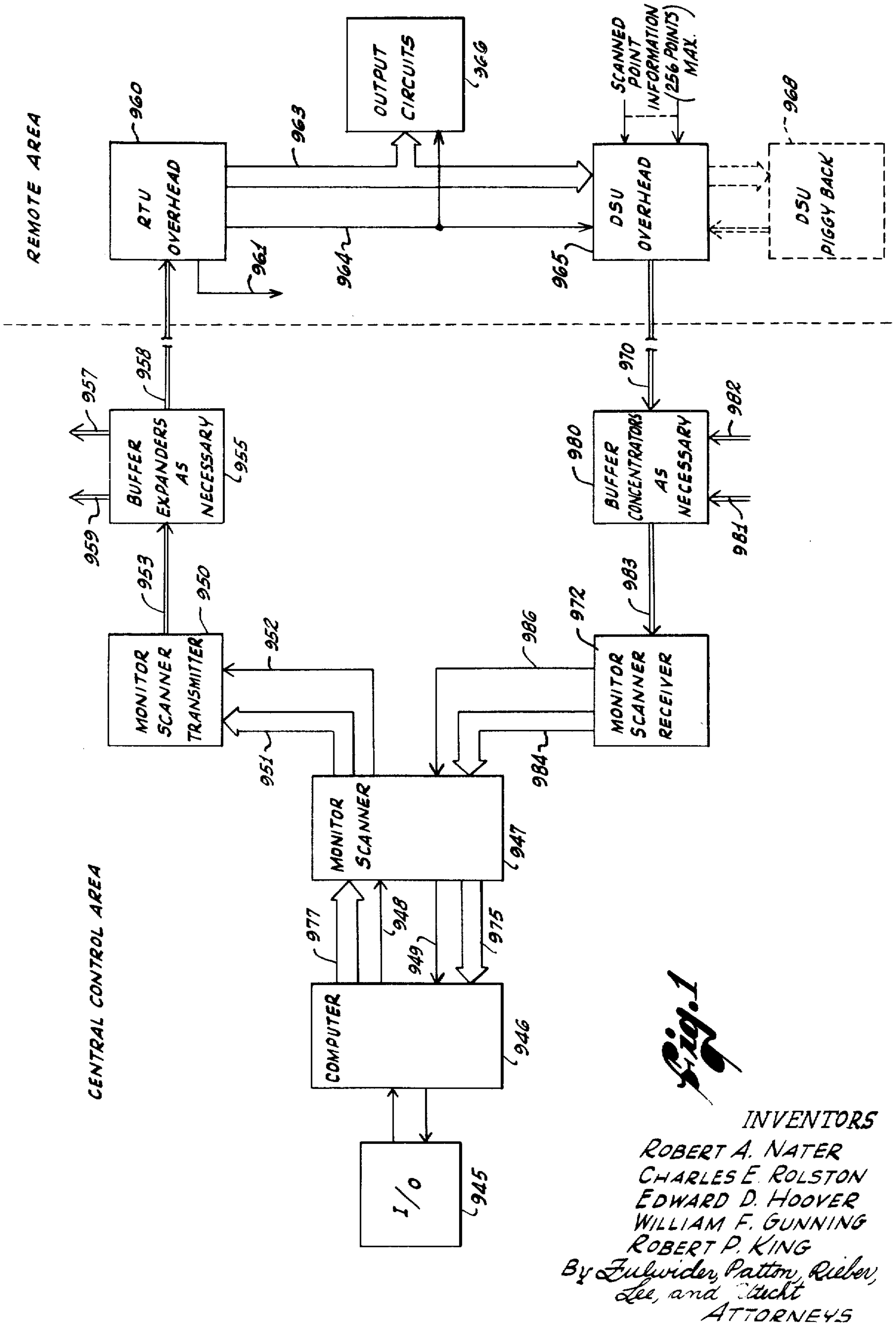
FIG. 1 is a block diagram of the Monitor System.

In any complex system or process, the states of thousands of discrete devices may be controlled. This system can monitor continuously the state of any aspect of a system or apparatus that can be indicated by the status of a discrete device. For example, the operation of the animation system set forth in the above referenced patent application entitled Digital Animation Apparatus and Methods may be monitored. In the discussion of the preferred embodiment herein, the operation of this monitor system will be made using the animation system as an example only. As will be appreciated, the monitor system may be utilized to monitor any type or kind of system or process. In the animation system, for example, lights may be on or off, curtains opened or closed, figures moved or not, sound tracks switched on or off, and so forth. Similarly, correct operation of many types of devices may be indicated by a discrete output. Examples are outputs of parity check circuits, temperature controllers, water height controllers, and so forth. In each case, the monitor system communicates the status of each discrete event to the central computer if the discrete event is off-normal. The computer then determines whether corrective action should be taken.

Corrective action may take two forms. In the first, the computer may simply output an error message to the system operator via standard output equipment. In the second, the computer may control restoration of the normal condition. In some cases, both responses may occur.

An example in the preferred embodiment of the first response is found in the animation system example in the occurrence of a parity error. A parity check circuit opens a pair of contacts following detection of a parity error. The monitor system communicates this off-normal condition to the computer which outputs a message to the computer operator, informing him of the parity error and its location.

An example of the second response is found in the output of a water height sensor in the animation system example. If the water level falls below a desired point, the level sensor opens a pair of contacts. This off-normal condition is communicated to the computer which, in turn, may control restorative action by turning on a water valve. In addition, the sequence may be reported to the computer operator by an error message.

The monitor system of this invention is essentially a closed loop. It is capable of scanning up to 65,536 contacts (points) in groups of 256 or, in case of an off-normal condition, one set of contacts at a time within a group. It is believed that this is an important feature of this system. It is capable of determining if any point in each 256 point group is off-normal. If so, it can then determine which of the 256 scanned points is off-normal.

In addition, the monitor system of this invention only utilizes the computer when off-normal conditions are encountered. This feature is important since it frees the computer for other work. When an off-normal condition is found by the system, an interrupt to the computer is generated. The computer is programmed to then service the interrupt on a time share basis with other inputs.

GENERALIZED SYSTEM

Referring to FIG. 1, a general block diagram of the monitor system is shown. Via standard input device 945, the computer operator enters a command causing the monitor program to be entered into the core of computer 946. This activates the monitor program and system. Thereafter, the monitoring sequence is initiated under control of the monitor program and continued automatically.

After the monitor program is loaded, computer 946 initializes monitor scanner 947 via control line 948. The monitor scanner then automatically begins and continues the monitoring sequence without computer intervention so long as no off-normal conditions are located. At the end of the scan or when an off-normal point is found, the monitor scanner generates an interrupt to computer 946 via line 949. The interrupt, having been assigned a priority by the computer executive program, causes the computer to process the information delivered to it by the scanner when the priority level is reached.

As will be explained in connection with the explanation of the scanning circuit, "normal condition" are defined herein as closed contacts. So long as the monitor scanner, then, finds all scanned contacts closed, no computer interrupt is generated. "Off-normal" is defined as open contacts. When this condition is found, the monitor scanner so advises the computer and also supplies it with the identity of the open contacts. The computer then checks a catalog of subroutines to determine what action is to be taken in response to the off-normal condition.

As will be readily appreciated, the monitor system of this invention is not limited to the sensing of closed contacts. Closure of normally open contacts may be readily sensed by inclusion of a small relay between the scanned points and the scanning circuit.

Scanned points (contact pairs) are connected to scanning circuits which, in turn, are grouped within discrete scanning unit modules. Each scanning circuit may sense the state of up to 16 scanned points. Up to 16 scanning circuits may be grouped in a single module termed a discrete scanning unit. Each scanning unit, then, may serve up to 256 discrete points. For purposes of addressing, each discrete scanning unit is considered a single unit.

Scanner 947 contains a counter which generates the address of the discrete scanning unit to be interrogated. In response to the initialization pulse on line 948, the scanner counter is set to 001 and the sequential interrogation begins.

Scanner 947 generates an 18 bit word, including two bits, the ninth and eighteenth, of parity. The first eight address bits of the interrogation word always consists of all ones. This initial byte is recognized as a flag by all discrete scanning units. The second eight address bits (bits nine through 17) contain a unique address generated by the scanner counter.

Each interrogation word is supplied to all discrete scanning units (DSU) in parallel. The initial eight bits (all ones) is recognized by all discrete scanning units. The second eight address bits is unique to one discrete scanning unit.

The 18 bit interrogation word is supplied in parallel to monitor scanner transmitter 950 via parallel lines 951. Transmitter 950 consists of a parallel to serial converter and a bi-phase transmitter. The transmitter is identical to the transmitter circuits used throughout this invention.

Transmitter 950 generates a double redundant output, consisting of serial data (address words here), bit sync and word sync lines. The transmitter is controlled to pass out the contents of the parallel to serial converter by control line 952.

The monitor scanner and its transmitters and receivers are preferably located adjacent the computer in a central area. Serial lines 953, then, serially transmit the scanner interrogation words over substantial distances.

There may be in the monitor system of this invention a maximum of 128 remote terminal units (RTU). For a description of a remote terminal unit, reference is made to the above referenced application entitled Digital Animation Apparatus and Methods. Each unit is served by a single input line for impedance matching purposes. In order to maintain the 600 ohm balanced loads where a plurality of remote terminal units are used, line 953 is inputted to buffer expander 955. The expander is explained in detail in connection with the discussion of FIGS. 14, 15 and 16 in the above referenced application. Its function is to accept a single input consisting of data, bit sync and word sync and supply three identical outputs of each. FIG. 1 illustrates expander 955 as having three outputs 957, 958, 959. It is understood that a single line supplies a single remote terminal unit and, therefore, as many expanders are used as necessary.

For simplicity, only output 958 is shown connected to a remote terminal unit. Serial lines 958 supply the interrogation words to the overhead circuits of remote terminal unit 960. As explained in detail in connection with the discussion of FIGS. 17 and 18 in the above referenced patent application, remote terminal unit overhead 960 serves a number of functions. It converts received data to non-return-to-zero form and tests it for parity, word sync and bit sync accuracy. Upon the occurrence of a predetermined number of errors, overhead 960 automatically switches to the opposite input of the two redundant input lines. The monitor system is advised of such a switch via line 961.

Overhead circuit 960 then converts the serial interrogation word input to parallel form. The parallel interrogation word is outputted via lines 963 along with a data strobe signal on line 964.

Accordingly, output circuits 966 and discrete scanning unit overhead circuits 965 are supplied with two interrogation words in parallel form. The most significant half of each such word is comprised of all ones and is recognized by all discrete scanning units. The least significant half of the word is unique to each discrete scanning unit 965.

There are a maximum of 128 remote terminal units (such as 960) and directly connected discrete scanning units (such as 965) according to this invention. Accordingly, the directly connected discrete scanning unit can be uniquely addressed by the least significant seven of the eight address bits (that is, $2^7 = 128$). The eighth, or most significant bit, however, is reserved for use in addressing a discrete scanning unit, such as 968, connected in parallel to directly connected unit 965. The second unit, which may or may not be used, is termed the piggyback discrete scanning unit. The address for each discrete scanning unit and its piggyback unit is identical except for the eighth, or most significant, bit. The directly connected scanning unit address always has a zero in the most significant position. A piggyback unit, where present, always has a one in that position of its address.

The first interrogation word transmitted by scanner 947 then, consists of two portions. The first half contains eight ones and a parity bit. The second half contains seven zeroes and a one in the least significant bit position, followed by a parity bit. This is recognized by discrete scanning unit 965 as its address.

Figure 4:
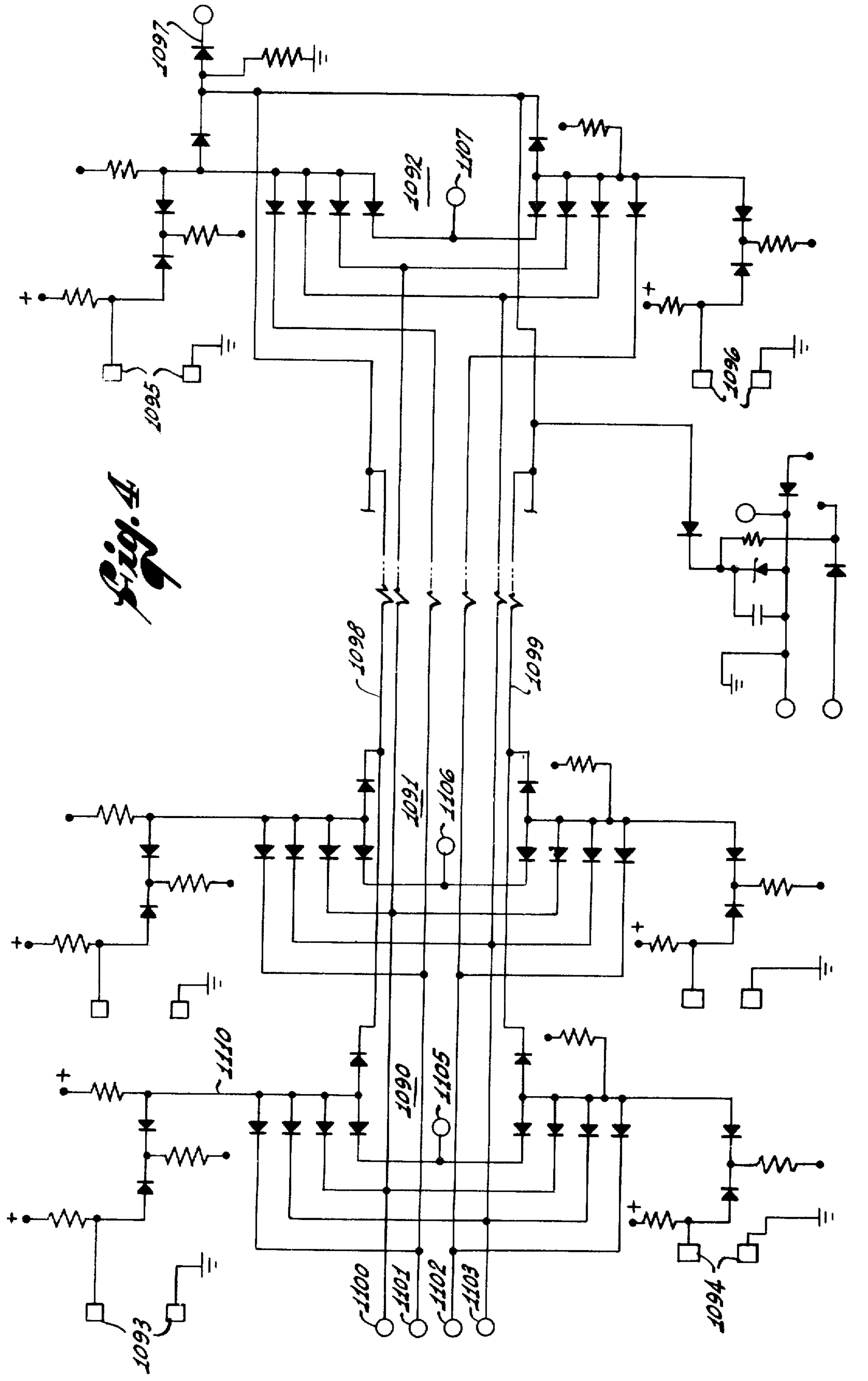
FIG. 4 is a schematic diagram of a Scanning Circuit of the Monitor System.

Scanning unit 965 contains overhead circuits and up to 16 scanning circuits, such as shown in FIG. 4. Each such scanning circuit is connected to 16 discrete scanned points. The normal condition for each such point is in the closed state. A single scanned open point is detected by overhead circuit 965 as an off-normal condition.

Scanning unit 965 generates one of four outputs in response to receipt of its interrogation word. The output is a function of whether or not all scanned points (up to 256) are normal and whether or not a scanning unit piggyback is connected. Each of the four outputs will be described.

In response to each interrogation word, an 18 bit status word is generated and outputted by the addressed scanning unit over lines 970. The first, or most significant, half (eight bits and parity) of the status word always consists of the address of the answering scanning unit. The output addressing scheme is identical to the input addressing scheme.

The second half of the status word (eight bits and parity) has one of four values, dependent upon whether or not all contacts are normal and whether or not a piggyback unit is connected.

If the status word indicates all contacts closed and no piggyback scanning unit, the address counter in monitor scanner 947 is incremented by one count in response to the output generated by unit 965. A new interrogation word is then transmitted via transmitter 950. Following the first interrogation word of the example herein, the next interrogation word would address discrete scanning unit number 002.

In the practical embodiment of this invention, the monitor scanner, once started, interrogates a new discrete scanning unit (256 scanned points) approximately every 500 microseconds. This scanning sequence and rate is continued until an off-normal condition is encountered.

If, in response to the first interrogation word, the status word returned by overhead unit 20 indicated all contacts normal but a connected piggyback scanning unit, the least significant seven bits of the address counter in scanner 947 are held unchanged and the most significant bit (bit 8) changed to a one. Thus, a new address is generated and forms the second half of a new interrogation word transmitted via transmitter 950. The address of each piggyback unit then, is identical to that of its associated directly connected unit, except for the value of the most significant bit.

The second interrogation word is again applied to all discrete scanning units. It is recognized and responded to, however, only by piggyback unit 968.

Unit 968 replies with a status word consisting, as above, of two parts. The first half contains the address of the piggyback unit. The second half contains one of two messages, depending upon whether all scanned points were normal or at least one was off-normal. Only one of two messages rather than one of four is sent because there can be no further piggyback units. If the reply indicates all scanned points normal, the scanner counter increments its least significant seven bits by one count and changes the most significant (eight) bit to a zero. Thereafter, the next successive interrogation word is transmitted.

In response to each interrogation word, the addressed discrete scanning unit scans all of its scanned points in parallel. The resultant status word indicates only whether all points are normal or whether any one or more are off-normal.

If the initial parallel scan indicates that any scanned points are off-normal, a second scan routine is automatically initiated by the addressed scanning unit. One at a time, the 16 scanned points of each of the up to 16 scanning circuits are checked. At the end of each circuit scan, the unit generates an eighteen bit word. The first eight bits correspond to the status of the first eight scanned points. Bits 10 through 17 correspond to the status of the second eight scanned points. In each case, a one at any bit position indicates that the correspondingly numbered scanned point is off-normal. As before, bits 9 and 18 are parity bits.

Accordingly, any interrogated discrete scanning unit having one or more off-normal scanned points generates a seventeen word reply. The first word, the status word, contains the unit address and the status of the unit, that is, whether all points are normal or whether any are off-normal, and whether there is a piggyback unit. Following are 16 words, each data bit of which corresponds to the status of one of the up to 256 scanned points.

The 17 words are received serially by scanner receiver 972, converted to parallel form and supplied to scanner 947.

Logic circuitry in scanner 947 first compares the status word address to the address in the interrogation address counter to insure that the proper scanning unit is responding.

Upon decoding the second half of the status word, logic circuitry within monitor scanner 947 recognizes whether an off-normal condition was found and, thereby whether 16 further words will be following. If an off-normal condition was found, monitor scanner 947 immediately signals the computer via line 949. Thereafter, the 17 words are transferred into the core of computer 946 via parallel lines 975. Upon completion of the seventeen word transfer, monitor scanner 947 generates a computer interrupt via line 949. Thereafter, the monitor information is processed by computer 946 in the order dictated by its assigned priority.

Computer 946 is programmed to examine the sixteen words relating to scanned point status bit-by-bit. As a bit denoting off-normal status is located, the computer is controlled by software to refer to a previously stored table of error subroutines. The subroutine may direct the printout of an appropriate error message via output device 945. Or, the subroutine may control restorative action to be taken.

If the subroutine controls the latter, the proper eighteen bit words are read out of memory of computer 946 via parallel lines 977. The word format is identical to that described in connection with the show control unit. The first half of each word contains an address (other than all ones) and the second half contains restorative data.

Restorative data is transmitted by transmitter 950 in the normal manner. Remote terminal unit 960 receives the data and, as explained above, outputs it in parallel form over line 963. As explained in connection with the control of an animated show (FIGS. 19 and 20), in the above referenced patent application, output circuits 966 take the form of discrete devices. In either case, data transferred from computer 946 may control the devices via output circuits 966 to correct the off-normal condition.

Referring to FIG. 1, discrete scanning unit 965 is shown with a single output line 970. Within unit 965 is a bi-phase transmitter circuit which forms the double redundant data, bit sync and word sync outputs used throughout this invention for transmission of data over distances. In FIG. 1, this bi-phase transmitter output is represented by line 970. Data is, as with all bi-phase transmitters, outputted serially by bit.

As explained elsewhere, data is transferred herein over 600 ohm balanced lines. Where more than one input is involved, therefore, the inputs must be multiplexed through a buffer concentrator. Since the monitor system of this invention may comprise up to 128 directly connected discrete scanning units, each with its own output, a plurality of buffer concentrators may be necessary. Each combines and multiplexes three inputs to a single output.

Buffer concentrator 980 accepts three input lines 970, 981, 982 and outputs a single parallel line 983. Details of the buffer concentrator may be found in the specification in connection with the discussion of FIGS. 9 and 10 in the above referenced patent application.

Scanner receiver 972 includes the identical bi-phase receiver circuit shown in FIG. 17 in the above referenced patent application. It converts the received bi-phase data to non-return-to-zero coding and applies the data coding to a serial-to-parallel converter. The output of the converter is transferred to monitor scanner 947 over parallel lines 984. When the coverter is fully loaded and ready to transfer, line 986 is turned on, controlling acceptance of the transferred word.

Following each processing of off-normal data, the computer controls, via line 948, the monitor scanner to begin its scanning sequence. In each case, the scanner retruns to its last scanned discrete unit address, increments the interrogation counter by one count, and continues from that point. After the last (highest address) discrete scanning unit is interrogated, the sequence begins as before with the first (lowest address) scanning unit.

Figure 2:
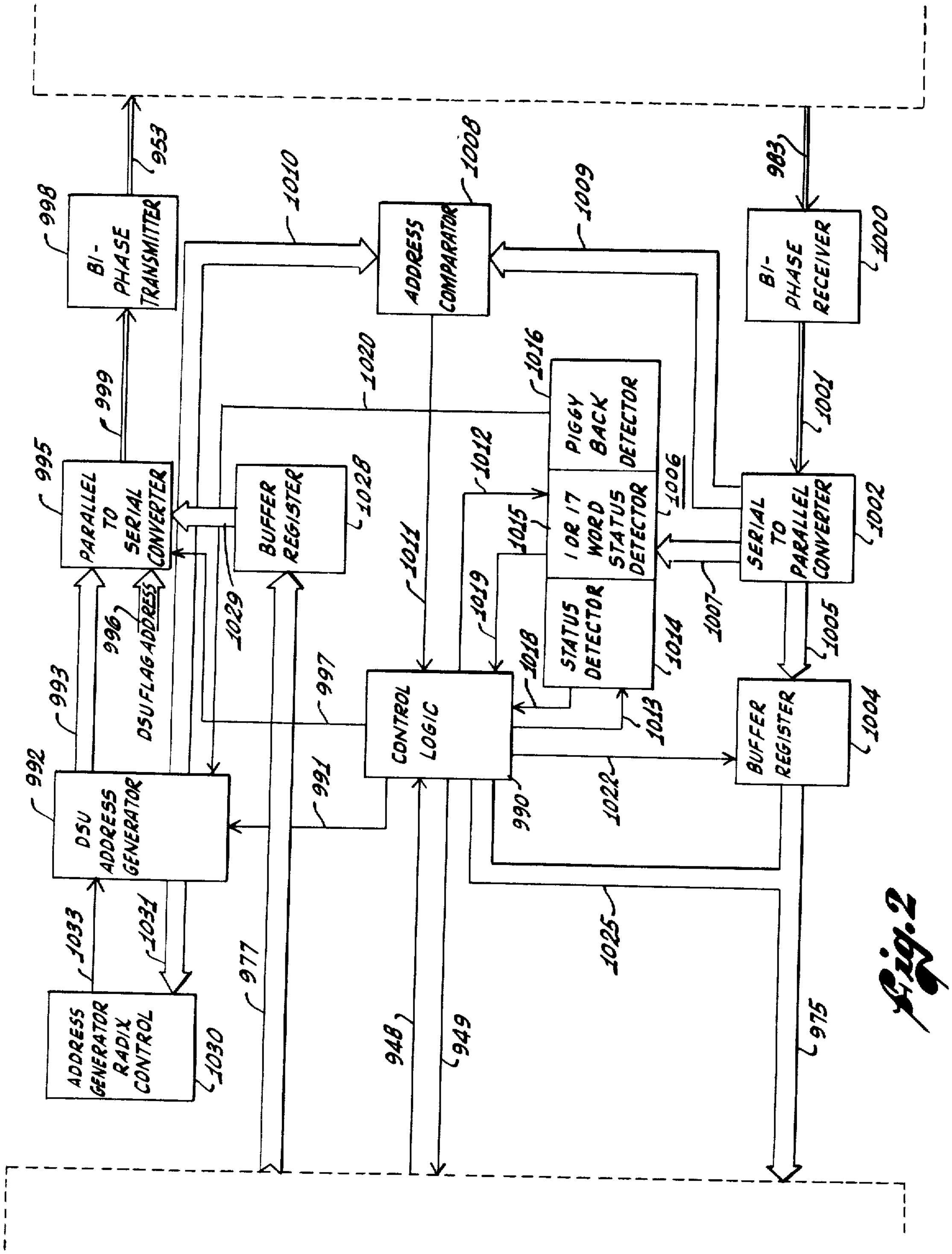
FIG. 2 is a block diagram of the Monitor Scanner of the Monitor System.

As will be explained in connection with the discussion of FIG. 2, the scanner may be controlled, via a radix control, to scan only up to a certain address before repeating. Further, via software control, the computer keeps a record of each reported off-normal condition and only executes the error subroutines in the case of changes. In this way, an error message is only outputted once in response to an off-normal condition.

The monitor system of this invention, then, provides the ability to check the status of up to 65,536 discrete points. In groups of up to 256, the points are scanned sequentially in parallel. If an off-normal condition is located in any one group, each point in that group is sequentially scanned and the status communicated to a computer. Computer time is only utilized when off-normal conditions are located and during control periods.

MONITOR SCANNER

In connection with the above discussion of FIG. 1, the operation of monitor scanner 947 was disclosed in connection with the monitor system. Referring to FIG. 2, a detailed diagram of the monitor scanner is illustrated along with details of the scanner receiver and scanner transmitter.

As described above, when the computer operator calls up the monitor program, the monitor circuit is initialized via computer control line 948. Control logic 990, via control line 991, causes discrete scanning unit address generator 992 to reset to the initial scanning unit address, or 001. Generator 992, consisting of a controllable counter, outputs the scanning unit address over parallel lines 993 to one input of parallel to serial converter 995.

It will be recalled that interrogation words are 18 bits in length and consist of two halves. The most significant half contains eight ones which serve as a flag recognized by all discrete scanning units. The second half contains eight bits indicating the interrogated scanning unit address. Each half is followed by a single parity bit.

The flag address half is inputted to converter 995 via parallel lines 996. The first half of each interrogation word, then, is obtained by converter 995 from input lines 993. The second half, or scanning unit address, is obtained by the converter from input line 996.

Converter 995 is a side loading counter. It is cycled out serially by control of logic 990 via control line 997. Its serial output is supplied to bi-phase transmitter 998 via line 999.

Transmitter 998 is disclosed in detail in FIG. 25 in the above referenced patent application. For the description here, it is sufficient to understand that it provides double redundant outputs of interrogation data, bit sync and word sync over serial lines 953.

As described in connectionn with FIG. 1, data transmitted over line 953 is supplied in parallel to all directly connected scanning units and output circuits. Depending upon the status of the scanned points connected to each of the units, each interrogated unit returns either a single 18 bit status word or the status word and 16 words each 18 bits in length. After passing through one or more buffer concentrators, the scanning unit return is received serially by bi-phase receiver 1000, over serial lines 983.

Receiver 1000 is identical to the receivers utilized throughout this invention and is disclosed in detail in FIG. 17 in the above referenced patent application. Its function is to accept the bi-phase encoded data, bit sync and word sync codes and output the data in non-return-to-zero form on line 1001.

Serial to parallel converter 1002 receives the serial data on line 1001 and end loads a series of shift registers. When converter 1002 is filled, the eighteen bits of the status word are available to buffer register 1004 via parallel lines 1005, available to the three stage detector unit 1006 via lines 1007 and to address comparator 1008 via lines 1009.

Address comparator 1008 is provided with two inputs, the returned scanning unit address from lines 1009 and the transmitted scanning unit address from lines 1010. Its function is to insure that the addressed scanning unit was the unit that responded. If comparator 1008 finds that the addresses match, it turns on line 1011, so advising control logic 990. Via control lines 1012 and 1013 logic 990 causes detector unit 1006 to diagnose the received status word.

Detector unit 1006 consists of three stages 1014, 1015, 1016, each for checking the status of aspects of the received status word.

Status detector 1014 serves a number of functions. It determines whether two or more scanning units tried to transmit at one time, whether the entire scan has been received, that is, whether one of 17 words have been received, whether a parity error occurred, and whether no response was received within a predetermined time limit. To indicate each of these conditions, a number of control lines are connected to logic 990. For simplicity, these lines are represented by line 1018.

Status detector 1015 checks the last half of the received status word to determine whether all scanned points were found to be normal or whether any were off normal. If all were normal, logic 990 is advised by line 1019 and, in turn, controls generator 992 via line 991 to generate a new interrogation address in accordance with the second address control via line 1020, as will be discussed.

If any off-normal scanned points were located, logic 990 indicates this to the computer via line 949. In such a case, 16 additional words are in the process of being transmitted via input line 983. In addition to signaling the computer, logic 990 also cycles buffer register 1004 via line 1022 to accept and pass the status word, and all 16 words following, to the computer via input lines 975.

In the event of off-normal conditions, control logic 990 generates a second status word containing the results of the testing by detector units 1006. This new status word is passed to the computer via parallel lines 1025 and 975.

Detector 1016 checks the last half of the status word to determine whether a piggyback unit is connected to the transmitting scanning units. If so, line 1020 is turned on to set a flip-flop in generator 992 to supply a binary one in the most significant bit position for the next scan.

The received words continue to be passed to the computer input register via buffer register 1004 until detector 1014 determines that the transmission has ended. Line 1022 thereafter ceases to cycle register 1004. If all points were found to be normal, address generator 992 transmits a new interrogation word and the above sequence is repeated. If points were found to be off-normal, the monitor scanner waits until it is controlled to resume scanning by computer control line 948.

In response to an off-normal scan, the computer, as previously explained may output restorative data via lines 977. This data, as in the case of the show control unit, would consist of 18 bit words. The first half would contain the address of the restoring output circuit and the second half would contain the restoring data.

Restorative information is passed via the computer output to buffer register 1028. When full, the contents of register 1028 are emptied via line 1029 to parallel to serial converter 995. Thereafter, the restorative information is transmitted to the proper output circuits (966, FIG. 1).

Upon the completion of the error processing sequence by the computer, logic 990 is controlled via line 948 to begin the scanning process anew. Generator 992 is then controlled via line 991 to generate the next address and scan the next scanning unit.

Radix control 1030 is provided with two inputs. One is the address provided by address generator 992 via lines 1031 and the second is the manually entered maximum address. The latter is entered via binary switches (not shown). Radix control compares the two inputs and resets generator 992 via line 1033 when the inputs are equal. In this way, the scanning range of the monitor system may be determined.

DISCRETE SCANNING UNIT OVERHEAD

Each discrete scanning unit (DSU), whether directly connected to a remote terminal unit or converted as a piggyback unit, is assigned a unique address. When properly addressed, each unit can scan the status of up to 256 contacts. Closed contacts are considered to be in a normal condition. If all contacts are closed, the unit is in its normal condition. If one or more of the contacts are open, an off-normal condition exists. It is the function of the discrete scanning unit to advise the monitor scanner, when interrogated, whether all contacts are normal and, if not, which contacts are off-normal.

Each discrete scanning unit contains up to 16 scanning circuits, which will be described in the following section. Each scanning circuit, in turn, is connected to up to 16 scanned points or pairs of contacts.

In addition to the scanning circuits, each unit contains circuitry for decoding received interrogation words, controlling the scans and generation of reply codes. These functions are performed in the overhead circuits of each scanning unit.

Figure 3:
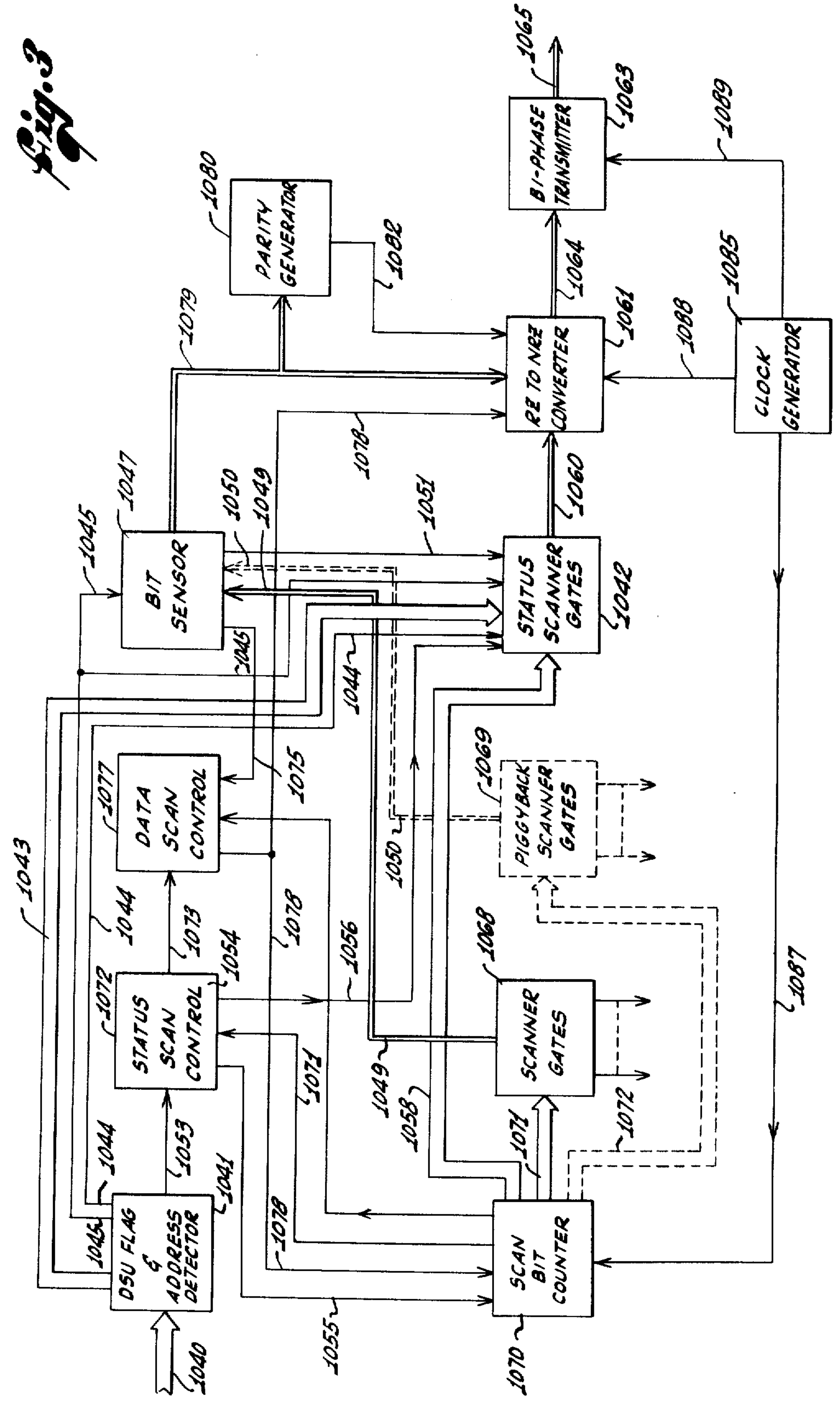
FIG. 3 is a block diagram of the Overhead portion of the Discrete Scanning Unit of the Monitor System.

Referring to FIG. 3, a block diagram of the overhead circuit of a discrete scanning unit is illustrated. Eighteen bit interrogation words are received by each discrete scanning unit overhead over parallel lines 1040. Flag and address detector 1041 checks each received interrogation word for the address byte common to all discrete scanning units (all one's) and the address byte unique to that unit. The common flag byte is used because of the presence of the output circuits (966, FIG. 1) which also receive the interrogation words and restorative data words. Since the initial portion of a restorative data word contains an address byte, this same format must be followed for the discrete scanning units.

It will be recalled that a two part status word is always returned from an interrogated discrete scanning unit. The first half consists of the address of the replying unit and the second half is set by four conditions; whether or not a piggyback unit is connected and whether or not all scanned points are normal.

Referring again to FIG. 3, as soon as flag and address detector 1041 recognizes the received interrogation word as its address, the second half of the interrogation word (the d.s.u. address) is made available to status scanner gates 1042 over parallel lines 1043. Line 1044 is controlled to be on by detector 1041 if a piggyback unit is connected. The presence or absence of a piggyback unit is indicated by a wired pin within detector 1041.

Parallel lines 1043, then contain the information necessary for the first half of the status word to be returned.

Detector 1041 also turns on or holds off line 1045 depending upon whether the received interrogation word contained an address of a directly connected or piggyback unit. This is determinedd by whether the most significant bit is a one or zero. It will be recalled that the seven least significant bits in the addresses of both units are identical. The difference is found in the most significant (eight) bit. In a piggyback unit, that bit is a one.

Line 1045 is connected to bit sensor 1047 to control whether sensor 1047 accepts serial input 1049 or 1050. The purpose of this control will be discussed below. Line 1045 also supplies the same information to status scanner gates 1042, that is, whether a directly connected or piggyback unit was addressed.

As will be explained below, prior to reception of the interrogation word, bit sensor 1047 was supplied with the information as to whether or not all contacts were normal or if any were off-normal. In response to this, the state of line 1051 is controlled. If, then, prior to receipt of the interrogation words, all scanned points were normal, line 1051 is off; if any scanned points were off-normal, line 1051 is on.

Accordingly, status scanner gates 1042 is supplied with all the information necessary for the status word to be returned as soon as the interrogation word is received by the overhead circuitry. The initial half, the unit address, is contained on parallel lines 1043. Information for the second half is found on control lines 1044, 1045 and 1051.

Returning to the point in time when flag and address detector recognizes its address, it then turns on line 1053. This controls the overhead to set a flip-flop in status scan control 1054 and start the scanning count which will cause return of the status word.

When the flip-flop in status scan control 1054 is set, lines 1055 and 1056 are turned on. As will be explained below, when line 1055 is turned on, the "all points" scanning lines are turned off and a scanning count begins on lines 1058. When line 1056 turns on, status scanner gates 1042 uses the scanning count pulses on parallel lines 1058 to scan parallel lines 1043 for the first half of the status word and scan logic gates set by the information inputs to gates 1042 for the second half.

The scanned status word is outputted serially on line 1060 to return-to-zero (RZ) to non-return-to-zero (NRZ) converter 1061. Converter 1061 is used to convert the scan status word to the code format used throughout the invention.

Thereafter, the status word is supplied to bi-phase transmitter 1063 via line 1064 and returned to the monitor scanner receiver (947, FIG. 1) via line 1065.

The above sequence for the status word return is performed in response to every decoded interrogation word, whether or not all points were normal. If all were normal, no further transmission is made.

Before explaining operation of the circuit in the event of points being found off-normal, a description of the constant monitoring feature will be given.

It will be recalled that the status of up to 256 scanned points is monitored by a single unit. As will be explained in connection with FIG. 4, each point, or all points may be selected by proper pulsing or matrix lines. When all matrix lines are on, the outputs of all scanning circuits are paralleled. The paralleled output has a state determined by whether all points are normal or if one, or more, are off-normal. This will be explained in greater detail in connection with the discussion of that FIGURE.

The matrix scanning lines are connected to each of the up to sixteen scanning circuits from scanner gates 1068 and piggyback scanner gates 1069 (if used). In each the status of the matrix lines is controlled by scan bit counter 1070 via lines 1071, 1072.

When the scanning unit is quiescent, that is, when it has not been interrogated, line 1055 is off and all matrix scanning lines ("all lines") are on. This causes the status of the scanned points to control the state of scanning circuit output lines 1049, 1050. For example, if all scanned points scanned by gates 1068 are normal during a quiescent period, line 1049 is up; if any are off-normal, the line is down.

Logic in bit sensor 1047 is set dependent upon the state of scanning circuit output lines 1049, 1050. When flag and address detector 1041 decodes an interrogation word, line 1045 is turned on, locking the status of the scanning circuit input lines in bit sensor 1047. Thereafter, the status of the lines is made available for the status word on line 1051, as explained above.

If bit sensor 1047 was controlled from a normal set of scanning circuits, line 1075 is held off. If, however, any points are found off-normal, line 1075 is turned on. As will be explained this is used to help control a point scan.

After scan bit counter 1070 completes the scan for the status word, it turns on line 1071 to status scan control 1072. The latter then turns on line 1073.

If lines 1075 and 1073 are both on, bit sensor 1047 had sensed an off-normal condition. The two lines then control data scan control 1077 to turn on line 1078. Line 1078 serves two purposes; it starts the scanned point scan by scan bit counter 1070 and controls converter 1061 to accept inputs from line 1079 rather than 1060.

When line 1078 turns on, scan bit counter 1070 begins to sequentially pulse scanning circuit matrix lines 1071, 1072. As will be explained below, sequential scanning causes a serial read-out of status bits from the scanning circuits via output lines 1049 or 1050.

Bit sensor 1047 accepts whichever scanning circuit input it had been previously controlled by line 1045 to accept and passes the status bits to converter 1061 and parity generator 1080 via line 1079. Generator 1080, via line 1082, adds the proper odd-parity bits to the bit stream. The sixteen eighteen bit words are then returned to the monitor receiver via line 1065.

Clock generator 1085, connected to scan bit counter 1070 via line 1087, to converter 1061 via line 1088 and bi-phase transmitter 1063 via line 1089, supplies the proper scan rates and bit transmission rates.

DISCRETE SCANNING CIRCUITS

Each overhead circuit controls the scanning of up to 16 scanning circuits with 16 scanned points on each circuit. The schematic diagram of a single scanning circuit is illustrated in FIG. 4. Since the operation of the circuit is readily apparent to a person skilled in the art, only a brief description will be given.

A scanning circuit consists of eight substantially identical sections. FIG. 4 shows three 1090, 1091, 1092 of the eight sections. Each section is connected to a pair of contacts. For example, section 1090 contains contact pairs 1093, 1094, section 1092, 1095, 1096, and so forth.

Each section is divided into upper and lower, identical, halves. Each half contains one set of scanned points or contact pairs. Each half is comprised of a five-input AND gate. Four of the five are scanning inputs and the fifth is the scanned point input. The AND gate is of familiar design.

All of the halves are outputted onto common line 1097 from half lines 1098, 1099. Ourput line 1097 forms the input to the bit sensor (line 1049 or 1050, FIG. 27 in the above referenced patent application).

There are two levels of scan lines. The major level consists of four lines 1100, 1101, 1102, 1103 and the minor level consists of eight lines of which three 1105, 1106, 1107 are shown.

During quiescent periods, all scanniing lines are up. If one scanned point is off-normal, line 1097 is up. For example, if contacts 1093 are open, a raised level is caused on line 1110 and, therefore, on line 1097. Any open contact, then causes line 1097 to be up.

Major lines are scanned to select halves of scanning circuits. Scanning line 1103 selects half of the discrete scanning unit. Line 1100 selects one scanning circuit within the half. Lines 1101, 1102 select the upper or lower halves of the cards.

If, then, line 1105 is pulsed after the upper half of all cards have been selected, contacts 1093 are monitored. By containing such a scan, the status of each of the 16 scanned points is outputted over line 1097.

MONITOR SYSTEM SOFTWARE

As described above, the monitor system according to this invention utilizes a programmed general purpose digital computer. The computer utilized by applicants in this invention is a Honeywell DDP-516, manufactured by Honeywell, Inc. Accordingly, the Monitor System program is written in a language suitable for that computer. The program set forth herein is in a basic assembly language, termed DAP-16 by Honeywell. This is a Honeywell language utilized for all of their 16 bit computers. The monitor system program is as follows.

MONITOR SYSTEM PROGRAM

```
*
TYPP EQU   '100
ADTK EQU   '101
DRO  EQU   '116
OUTL EQU   '131
BUSY EQU   '301
OLAY EQU   '304
TTOF EQU   '312
DBYO EQU   '327
BUF  EQU   '11000
DIDD EQU   '35000
     ORG   '700
DSU  PZE
ISEC PZE                 STRT TRK/SEC
DSUC PZE                 DSU CNTR
BUFF DAC   BUF
TM   PZE                 DISC NOT BUSY Q
TMM  PZE                 ASR NOT BUSY Q
SAA  DAC   SA
DPC  PZE                 DISC PARITY COUNTER
DRD  PZE                 THIS DISC READ TASK ADR
WCTR PZE                 WORD CNTR
BCTR PZE                 BIT SHIFT CNTR
AV   PZE                 ACCESS VECTOR
SHFT PZE                 HOLDER FOR SHIFT VALUE
TEM  PZE
BNUM PZE                 BIT NUMBER
SRBB DAC   SERB          SERIAL BUF ADR
M2A  DAC   MS2A
     DAC   MS2A+1
M2D  DAC   MS2D
     DAC   MS2D+1
M2E  DAC   MS2E
     DAC   MS2E+1
DSTT DAC   DSUT
AS3  DAC   ASC
     ORG   '1000
     DAC   MO
MO   PZE
     PZE
     JST*  TYPP
     DAC   MS1           MONITOR STATUS
     DEC   7
     LDA   MO2-1         W ASR WAIT
     JST*  ADTK
     LDA   MO4-1         Q CONTINUE AFTER WAIT
     STA   TMM
     LDA   =-10
     STA   DPC           SET DISC PARITY CNTR
     LDA   SAA
     STA   AV            INIT ACCESS VEC
     LDA   =-16
     STA   WCTR          SET WRD CNTR
     STA   BCTR          SET BIT CNTR
     JMP*  MO+1          EXIT
*
*WAIT FOR ASR OUTPUT
*
```

```
      DAC    M02
M02   PZE
      PZE
      LDA    TTOF
      SZE
      JMP    M02B              RE-Q
      LDA    TMM               Q FOLLOW ON TASK
M02A  JST*   ADTK
      JMP*   M02+1             EXIT
M02B  LDA    M02-1             RE-Q THIS TASK
      JMP    M02A
*
*INITIALIZE FOR FIRST DSU.
*
      DAC    M04
M04   PZE
      PZE
      LDA    =-100             SET UP FOR 100 DSU'S
      STA    DSUC              SET DSU CNTR
      LDA    =1
      STA    DSU
      LDA    M4X-1
      JST*   ADTK
      JMP*   M04+1             EXIT
*
*COMPUTE TSEC OF PTR TBL. Q PTR TABLE READ
*
      DAC    M4X
M4X   PZE
      PZE
      LDA    DSUC              DSU CNTR
      ADD    =100
      STA    DSU
      LGL    5                 MPY
      ADD    ='10000           BASE TRK 16
      STA    TSEC              TRK/SEC OF PTR TBL
      LDA    M06-1
      JST*   ADTK
      JMP*   M4X+1             EXIT
*
*READ MESSAGE POINTER TABLE FROM DISC.
*
      DAC    M06
M06   PZE
      PZE
      LDA    DBYD
      SZE
      JMP    M06B
      LDA    TSEC
      JST*   DRD
      DAC    BUF
      DEC    256
      LDA    M010-1
      STA    TM
      LDA    M08-1             DISC READY
M06A  JST*   ADTK
      JMP*   M06+1             EXIT
M06B  LDA    M06-1             RE-Q
      JMP    M06A
*
*CHECK DISC BUSY
*
      DAC    M08
M08   PZE
      PZE
      SKS    '121
      JMP    M08B              RE-Q
      LDA    DP-1              Q DISC PARITY CK
M08A  JST*   ADTK
      JMP*   M08+1
M08B  LDA    M08-1             RE-Q
      JMP    M08A
*
*COMPUTE STARTING TRACK AND SECTOR FOR STATUS READ.
*
      DAC    M010
M010  PZE
      PZE
      LDA    DSU
      ADD    ='16200           TRK28 SEC 128
      STA    TSEC
      LDA    M010-1
      STA    DRD               THIS TASK IF PARITY
      LDA    M011-1            Q STATUS READ
      JST*   ADTK
      JMP*   M010+1            EXIT
*
*READ 1 SECTOR OF MONITOR STATUS FROM DISC.
*
      DAC    M011
M011  PZE
      PZE
      LDA    DBYD
```

```
      SZE
      JMP    M11B
      LDA    =-16
      STA    WCTR              SET WRD CNTR
      STA    BCTR              SET BIT CNTR
      LDA    SAA
      STA    AV                SET ACCESS VECTOR
      LDA    TSEC
      JST*   DHO
      DAC    SA                STATUS AREA
      DEC    16
      LDA    M012-1            NEXT TASK
      STA    TM
      LDA    M08-1             DISC READY CHECK
M11A  JST*   ADTK
      JMP*   M011+1            EXIT
M11B  LDA    M011-1            RE-Q
      JMP    M11A
*
*INITIALIZE FOR WORD EXAMINATION.
*
      DAC    M012
M012  PZE
      PZE
      LDA*   AV                FIRST WORD
      STA    SHFT              STR IN SHIFT HOLDER
      LDA    M013-1            Q SHIFT ROUTINE
      JST*   ADTK
      JMP*   M012+1            EXIT
*
*SHIFT AND CHECK FOR BIT ON.
*
      DAC    M013
M013  PZE
      PZE
      LDA    SHFT
      LGL    1                 LEFT 1
      STA    SHFT
      SSC                      IS BIT=1
      JMP    M13B              INCR BIT CNTR
      LDA    WCTR              YES COMPUTE BIT POS
      ADD    =16
      LGL    4                 MPU BY 16
      STA    TEM
      LDA    BCTR
      ADD    =16               COMPUTE BIT NUM THIS WORD
      ADD    TEM
      STA    BNUM
      ADD    BUFF              COMPUTE MESSAGE PTR ADR
      STA    TEM               STR MSG PTR ADR
      LDA*   TEM               ERR MSG STRT TRK/SEC
      SNZ
      JMP    M13B              Q INCR BIT CNTR
      STA    TSEC
      LDA    M019-1            Q SERIAL READ MESSAGE TASK
      STA    TM
      LDA    M014-1            Q DISC READ
M13A  JST*   ADTK
      JMP*   M013+1            EXIT
M13B  LDA    M015-1            Q INCR BIT CNTR
      JMP    M13A
*
*READ ERROR MESSAGE FROM DISC.
*
      DAC    M014
M014  PZE
      PZE
      LDA    DBYD
      SZE
      JMP    M14B
      LDA    TSEC
      JST*   DHO
      DAC    MS2B              CANNED MSG AREA
      DEC    9
      LDA    M014-1
      STA    DRD               RE Q IF DISC PARITY
      LDA    M019-1            Q NEXT TASK
      STA    TM
      LDA    M08-1
M14A  JST*   ADTK
      JMP*   M014+1            EXIT
M14B  LDA    M014-1            RE-Q
      JMP    M14A
*
*INCR BIT COUNTER
*
      DAC    M015
M015  PZE
      PZE
      IRS    BCTR
      JMP    M15B              Q BIT SHIFT
      LDA    =-16
```

```
     STA   BCTR
     LDA   M016-1             Q WRD INCR
M15A JST*  ADTK
     JMP*  M015+1             EXIT
M15B LDA   M013-1             Q SHIFT AND CK
     JMP   M15A
*
*WORD COUNTER INCREMENT ROUTINE
*
     DAC   M016
M016 PZE
     PZE
     IRS   AV                 INCR ACCESS VEC
     IRS   WCTR               INCR WRD CNTR
     JMP   M16B               GET NEXT WORD
     LDA   SAA
     STA   AV                 RESET ACCESS VEC
     IRS   DSUC               INCR DSU CNTR
     JMP   M16D
     LDA   M017-1             Q MON STAT COMPLETE TYPEOUT
M16A JST*  ADTK
     JMP*  M016+1             EXIT
M16B LDA   M012-1             Q NEW WORD INIT
     JMP   M16A
M16D LDA   M4X-1              Q NEXT DSU PROCESS
     JMP   M16A
*
*TYPE MONITOR STATUS COMPLETE.
*
     DAC   M017
M017 PZE
     PZE
     JST*  TYPP
     DAC   MS3                MONITOR STATUS COMPLETE
     DEC   12
     LDA   M018-1             CLR BUSY FLAG
     STA   TMM
     LDA   M02-1              WAIT FOR ASR OUTPUT
M17A JST*  ADTK
     JMP*  M017+1             EXIT
*
*CLEAR BUSY FLAG.
*
     DAC   M018
M018 PZE
     PZE
     CRA
     STA   BUSY
     STA   OLAY               CLR OVERLAY FLAG
     JMP*  M018+1             EXIT
*
*INITIALIZE TO READ SERIAL NUMBERS FROM DISC.
*
     DAC   M019
M019 PZE
     PZE
     LDA   DSU                COMPUTE SERIAL NUM TRK/SEC
     LGL   4                  MPY BY 16
     ADD   ='22400            ADD BASE TRACK 37
     STA   TSEC
     LDA   M019-1
     STA   DRD
     LDA   M021-1             Q MSG FORMATTING TASK
     STA   TM
     LDA   M020-1             Q DISC READ
     JST*  ADTK
     JMP*  M019+1             EXIT
*
*READ SERIAL NUMBERS FROM DISC.
*
     DAC   M020
M020 PZE
     PZE
     LDA   DBYO
     SZE
     JMP   M20B
     LDA   TSEC
     JST*  DRO
     DAC   SERB
     DEC   256
     LDA   M021-1             Q MSG FORMAT
     STA   TM
     LDA   M06-1              Q DISC READY
M20A JST*  ADTK
     JMP*  M020+1             EXIT
M20B LDA   M020-1             RE-Q
     JMP   M20A
*
*FORMAT ERROR MESSAGE FOR OUTPUT
*
     DAC   M021
M021 PZE
     PZE
```

```
      LDA   BNUM              BIT NUM
      ADD   SRBB              COMPUTE SERIAL NUM ADR
      STA   TEM
      LDA*  TEM               SER NUM
      JST*  AS3               3 DIG ASCII
      STA*  M2A
      IAB
      STA*  M2A+1             STR SER LSD
      LDA   DSU
      SUB   =1
      LGL   1
      ADD   DDD
      STA   M21F
      LDA*  M21F              2 DSU ID MSD
      IRS   M21F
      STA*  M2D               STR DSU IN MSG
      LDA*  M21F              2 DSU ID LSD
      STA*  M2D+1
      LDA   BNUM              BIT NUMBER
      JST*  AS3
      STA*  M2E               STR 2 BIT MSD
      IAB
      STA*  M2E+1             STR BIT LSD
      LDA   M022-1            Q MSG TYPEOUT
      JST*  ADTK
      JMP*  M021+1            EXIT
M21F  PZE
DDD   DAC   DIDD
*
*TYPEOUT ERROR MESSAGE
*
      DAC   M022
M022  PZE
      PZE
      JST*  TYPP
      DAC   MS2A              ERROR MESSAGE
      DEC   21
      LDA   M015-1            Q INCR BIT CNTR
      STA   TMM
      LDA   M02-1             Q ASR WAIT FOR OUTPUT
M22A  JST*  ADTK
      JMP*  M022+1            EXIT
*
*CHECK FOR DISC PARITY.
*
      DAC   DP
DP    PZE
      PZE
      SKS   '621              SKP PARITY ERR NOT DETECTED
      JMP   DP3
      LDA   TM                Q NEXT TASK
      JST*  ADTK
      LDA   =-10
      STA   DPC               SET DISC PARITY CNTR
      CRA
      STA   DBYO
      JMP*  DP+1              EXIT
DP3   CRA
      STA   DBYO
      IRS   DPC
      JMP   DP5
      LDA   DPT-1             Q DISC PARITY TYPE OUT
      JST*  ADTK
      JMP*  DP+1
DP5   LDA   DRD               RE Q THIS DESC READ
      JST*  ADTK
      JMP*  DP+1              EXIT
*
*TYPE DISC PARITY.
*
      DAC   DPT
DPT   PZE
      PZE
      JST*  TYPP
      DAC   MS2               DISC PARITY
      DEC   7
      LDA   M02-1             Q UP WAIT
      JST*  ADTK
      LDA   M018-1            Q UP BUSY CLR
      STA   TMM
      JMP*  DPT+1             EXIT
*
*CONVERT 3 DIGIT ASCII TO BINARY.
*2 MSD IN A ON EXIT
*LDS + SPACE IN B ON EXIT
*
ASC   PZE
      STA   AC5               SAVE BIN NUM
      IAB
      CRA
      DIV   =10
      IAB
```

```
     ALR   8
     ADD   ='130240
     STA   AC7                 LSD ASCII + SPACE
     CRA
     DIV   =10
     LGL   8
     STA   AC6
     IAB
     ADD   AC6
     ADD   ='130260
     STA   AC6
     LDA   AC7
     IAB                       LSD TO B
     LDA   AC6                 2MSD TO A
     JMP*  ASC
AC5  PZE
AC6  PZE
AC7  PZE
     FIN
     ORG   '2000
     OCT   1
     DEC   7
MS1  BCI   7,MONITOR STATUS
     OCT   1
     DEC   6
MS2  BCI   9,DISC D PARITY
     OCT   1
     DEC   12
MS3  BCI   6,MONITOR STAT
     BCI   6,US COMPLETE
MS2A BCI   2,                  SERIAL NUM
MS2B BCI   9,ERR MSG
     BCI   1,                  2 SPACES
MS2C BCI   3,OP                OPEN CONTACT
MS2D BCI   3,DSU               DLU ID
MS2E BCI   3,BIT               BIT NUM
     ORG   '4000
SA   BSS   16                  STATUR BUFFER AREA.
SERB BSS   256                 SERIAL NUM BUFFER AREA
DSUT BSS   100                 DSUID TABLE
     END
*WED 970622-8. EXA MODE.
*J. ISBILL.

     ORG   '3000
     EXA
     JMP   *+1
     JST   ML
     HLT
     JMP   *-2
ML   PZE
     EXA
     JMP   *+1
     JST*  TYP
     DAC   MS1                 MESSAGE LOAD
     DEC   6
     JST   ONL                 CK DISC ON LINE
     JST*  TYP
     DAC   MS3                 INSERT MSG TAPE IN HS READER
     DEC   14
     HLT
ML5  JST   RN                  CALL DECIMAL INPUT
     STA   MNUM                STORE MESSAGE NUMBER
     JST   ASIN                INPUT ASCII MSG
     JST   STRM                STR MSG ON DISC
     JMP   ML5
ML8  JST*  TYP
     DAC   MS4                 MESSAGES LOADED
     DEC   8
     JMP*  ML
MNUM PZE                       MESSAGE NUMBER
CHR  PZE                       CHARACTER STORE
BUFF DAC   BUF
BUF  BSS   9                   ASCII BUFFER
     OCT   120240
ABFA PZE                       ASCII BUFFER STORAGE VEC
ACTR PZE                       ASCII WORD CNTR
AC20 PZE                       UPPER HALF FLAG
TSEC PZE
*
*CHECK DISC ON LINE
*
ONL  PZE
NL1  SKS   '1021
     JMP   *+2
     JMP*  ONL
     JST*  TYP
     DAC   MS2                 DISC NOT ON LINE
     DEC   8
     HLT
     JMP   NL1
*
*H.S. READER DECIMAL INPUT. COMMA SIGNALS END.
*
```

```
RN   PZE
RN1  CRA
     STA   RN3
RN2  JST   RIN              INPUT A CHAR FROM READER
     CAS   RU
RU   OCT   377
     JMP   RN1
     CAS   ='254
     JMP   *+2
     JMP   RNEX
     CAS   ='223
     JMP   *+2
     JMP   ML8
     JST   VDN              CK FOR VALID DEC CHAR
     STA   RN4
     LDA   RN3
     MPY   =10
     IAB
     ADD   RN4
     STA   RN3
     JMP   RN2
RNEX LDA   RN3
     JMP*  RN
RN3  PZE
RN4  PZE
*
*CHECK FOR VALID DECIMAL CHARACTER.
*
VDN  PZE
     CAS   ='260
     JMP   *+3
     JMP   *+5
     JMP   RN2
     CAS   ='271
     JMP   RN2
     JMP   *+1
     SUB   ='260
     JMP*  VDN
*
*READ IN A CHARACTER FROM THE HS READER.
*
RIN  PZE
     OCP   1
     INA   '1001
     JMP   *-1
     OCP   '101
     JMP*  RIN
*
*INPUT ASCII MESSAGE
*
ASIN PZE
     LDA   BUFF
     STA   ABFA
     LDA   =9
     TCA
     STA   ACTR
     CRA
     STA   AC20
     JST   FBS              FILL BUFFER WITH SPACES
AC5  JST   RIN              GET CHAR
     STA   AC25
     CAS   ='254            IS CHAR COMMA
     JMP   *+2
     JMP   AC8
     LDA   AC20             UPPER HALF FLAG
     SZE
     JMP   AC6              THIS IS LOWER HALF
     IRS   AC20             SET UPPER HALF FLAG
     LDA   AC25
     ALR   8
     STA*  ABFA
     JMP   AC5              GET NEXT CHAR
AC6  LDA*  ABFA
     ADD   AC25
     STA*  ABFA
     IRS   ABFA
     CRA
     STA   AC20             CLR UPPER HALF FLAG
     IRS   ACTR
     JMP   AC5
     JMP   AC15
AC8  LDA   AC20
     SNZ
     JMP   AC10
     LDA*  ABFA
     ADD   ='240
     STA*  ABFA
AC10 JMP*  ASIN
AC15 JST   RIN
     CAS   ='254
     JMP   AC15             IGNORE AFTER 18 CHAR
     JMP*  ASIN
     JMP   AC15
```

```
AC25 PZE
*
*FILL BUFFER WITH SPACES.
*
FBS  PZE
     LDX   =-9
     LDA   ='120240          2 SPACES
     STA*  FB5,1
     IRS   0
     JMP   *-2
     JMP*  FBS
FB5  DAC   BUF+9
*
*WRITE MESSAGE ON DISC.
*
DW   PZE
DW1  LDA   BUFF              BUF BEG ADR
     STA   '20               SET BEG ADR
     ADD   =9
     STA   '21               SET END ADR
     SKS   '121
     JMP   *-1
     LDA   TSEC              TRK/SEC
     OCP   '321
     OCP   '521              GIVE WRITE COMMAND
     OTA   '21
     JMP   *-1
     SKS   '121              WAIT FOR WRITE
     JMP   *-1
     JMP*  DW
*
*STORE ERROR MESSAGE ON DISC
*
STRM PZE
     LDA   ='22000           BASE TRACK 36
     ADD   MNUM              ADD MSG NUM
     STA   TSEC
     JST   DW                WRITE MESSAGE ON DISC
     JMP*  STRM
TYP  DAC   TYPE
     FIN
*
*TYPE ROUTINE.
*
TYPE PZE
     STA   TY7               SAVE A
     SKS   '104              CK ASR READY
     JMP   *-1
     OCP   '104              ENABLE OUTPUT
     LDA*  TYPE              MSG BEG ADR
     STA   TY9               STR ACCESS VECTOR
     IRS   TYPE
     LDA*  TYPE              WRD CNT
     IRS   TYPE
     SMI
     JMP   TY6
     STA   TY8               SET WRD CNTR
TY5  LDA*  TY9               2 CHAR
     JST   TY20
     IRS   TY9
     IRS   TY8
     JMP   TY5
     LDA   TY7
     JMP*  TYPE
TY6  TCA
     STA   TY8
     JST   CRLF
     JMP   TY5
TY20 PZE
     ICA                     INTERC  A
     OTA   4
     JMP   *-1
     ICA                     IN
     OTA   4
     JMP   *-1
     JMP*  TY20
*
*CARRIAGE RETURN LINE FEED.
*
CRLF PZE
     LDA   ='106612          CRLF
     JST   TY20
     JMP*  CRLF
TY7  PZE
TY8  PZE
TY9  PZE
     FIN
MS1  BCI   6,MESSAGE LOAD
MS2  BCI   8,DISC NOT ON LINE
MS3  BCI   8,INSERT MSG TAPE
     BCI   6,IN MS HEADER
MS4  BCI   8,MESSAGES LOADED
     END
```

```
*
      ORG    '2000
      EXA
      JMP    *+1
      JST    SUBL
      HLT
      JMP    *-2
SUBL  PZE
      EXA
      JMP    *+1
      JST*   TYP
      DAC    MS2              DAP16 SUBR LOAD
      DEC    8
      JST    ONL
SL5   JST*   TYP
      DAC    MS5              SELECT SUB NUM
      DEC    8
      JST    XN
      STA    SUBN
      JST    LCK
      JST*   TYP
      DAC    MS3              INSERT SUBR TAPE IN HS READER
      DEC    15
      CRA
      HLT
      JST    STRT             LOAD SUBROUTINE
      JST*   TYP
      DAC    MS4              MODIFY SUBR AS DESIRED
      DEC    23
      HLT
      JST    SSUB             STORE LOADED SUBR
      JST*   TYP
      DAC    MS6              SUBR LOADED
      DEC    6
      JMP*   SUBL
*
*CHECK DISC ON LINE.
*
ONL   PZE
NL1   SKS    '1021
      JMP    *+2
      JMP*   ONL
      JST*   TYP
      DAC    MS8              DISC NOT ON LINE
      DEC    8
      HLT
      JMP    NL1
*
* STORE LOADED SUBROUTINE.
*
SSUB  PZE
      LDA    SUBN             SUBR NUM
      LGL    3                MPY BY 8
      ADD    ='25400          ADD BASE TRK 43 SEC 64
      STA    TSEC
      JST    DW               WRITE DISC
      JMP*   SSUB
*
* WRITE SUBROUTINE ON DISC
*
DW    PZE
DW1   LDA    SUBF             BUFFER ADDRESS
      STA    '20
      ADD    =127
      STA    '21
      SKS    '121
      JMP    *-1
      LDA    TSEC
      OCP    '321             INTERLACED
      OCP    '521             WRITE
      OTA    '21              GIVE STRT TRK/SEC
      JMP    *-1
      SKS    '121             WAIT FOR WRITE
      JMP    *-1
      JMP*   DW
*
* LIMIT CHECK SUBR NUM.
*
LCK   PZE
      SNZ
      JMP    SL5
      CAS    =4000
      JMP    SL5
      JMP*   LCK
      JMP*   LCK
* DECIMAL INPUT. COMMA SIGNALS END.
*
XN    PZE
XN1   CRA
      STA    XN3
XN2   JST    IN
      CAS    RU
```

```
RU   OCT  377
     JMP  XN1
     CAS  ='254          IS CHAR COMMA
     JMP  *+2
     JMP  XNEX
     JST  VNUM           CK VALID NUM. CONV TO BIN
     STA  XN4
     LDA  XN3
     MPY  =10
     IAB
     ADD  XN4
     STA  XN3
     JMP  XN2
XNEX LDA  XN3
     JMP* XN
XN3  PZE
XN4  PZE
*
* CHECK FOR VALIN NUM. CONV TO BIN.
*
VNUM PZE
     CAS  ='260
     JMP  *+3
     JMP  *+5
     JMP  XN2
     CAS  ='271
     JMP  XN2
     JMP  *+1
     SUB  ='260
     JMP* VNUM
*
* INPUT A CHAR FROM ASR.
*
IN   PZE
     SKS  '104           ASR BUSY
     JMP  *-1
     OCP  '4
     INA  '1004
     JMP  *-1
     JMP* IN
SUBN PZE
TSEC PZE
SUBF DAC  BUF
BUF  EQU  '37000
*
*DAP 16 ABSOLUTE LOADER.
*
STRT PZE
     LDA  SUBF           SUBR BUFFER ADR
     SSM                 SET SIGN BIT TO INDICATE ABS MODE
     STA  RF             OF LOADING AS DEFAULT MODE.
*
* ESTABLISH SECTOR ZERO LINKAGE BASE.
*
*
* PRE-LOAD INITIALIZATION.
*
     CRA                 SET LINK COUNTER TO ZERO.
JUNK STA  LC
* SEARCH FOR START OF RECORD
*
NXTR JST  INPT           GET CHAR
     ERA  SOM            COMPARE CHARACTER WITH
     SZE                 START OF RECORD CODE ('201).
     JMP  NXTR           CONTINUE SEARCHING FOR SOM (201)
*
* PRE-RECORD INITIALIZATION
CCKM CRA                 CLEAR OUT CHECKSUM
     STA  CKSM           CLEAR CHECKSUM.
     STA  RSW            SET READ SWITCH TO READ FULL WORD.
*
* READ CONTROL WORD (24 BITS) AND DETERMINE BLOCK TYPE.
*
     JST  WORD           READ CONTROL WORD.
     ARR  8              POSITION BLOCK CODE.
     LGR  1              PUT M.S. BIT OF LOW DIGIT INTO C.
     CAS  =3             CHECK HIGH DIGIT-
     JMP  BCER           GREATER THAN 3, ERROR.
     HLT
     SSC                 IF C=0.
     JMP  BCER           ERROR.
     STA  0              OTHERWISE.
     JMP  *+1,1          GO PROCESS
     JMP  DATA           DATA BLOCK (0) OR
     JMP  END            END BLOCK (1).
SOM  OCT  201
*
* ILLEGAL BLOCK OR ADDRESS TYPE CODE.
BCER JST* TYP
     DAC  MS1            BAD TAPE
     DEC  4
     JMP* SUHL
*
```

```
* END OF RECORD PROCESSOR.
*
EOR  JST   READ              READ CHECKSUM.
     JST   CKCK              CHECK CHECKSUM.
     JMP   NXTR              GO TO CHECK SWITCHES
*
* END BLOCK PROCESSOR
*
END  JST   LOC               ESTABLISHED STARTING ADDRESS.
     STA   TEMP              SAVE STARTING ADDRESS.
     JST   READ              READ CHECKSUM.
     JST   CKCK              CHECK CHECKSUM.
     LDA   BASE              GET CURRENT LINKAGE EXTENT AND
     LLL   7                 REMOVE INDEX BIT
     LLR   9                 MOVE TO B FOR POSSIBLE SUBSEQUENT LOAD.
     LDA   CLOC              GET LAST LOCATION LOADED PLUS ONE
     JMP*  STRT              EXIT LOAD COMPLETE
     SNZ                     IF (A) IS ZERO.
     JMP*  TEMP              GO TO START OF PROGRAM JUST LOADED.
     JMP*  STRT
*
* DATA BLOCK PROCESSOR.
*
DATA IAB                     BRING WORD COUNT TO A(3-8).
     LGR   7                 RIGHT-JUSTIFY AS WORD COUNT *2.
     SUB   =10               FORM (WC-4)*2)-2
     STA   CLOC              AND SAVE TEMPORAILY.
     JST   LOC               ESTABLISH BLOCK ORIGIN.
     IMA   CLOC              SET CURRENT LOCATION POINTER.
*                            RETURNING WORD COUNT TO A.
WCCK SPL                     CHECK WORD COUNT.
     JMP   EOR               IF NEGATIVE, END OF RECORD.
     STA   WC                OTHERWISE, SAVE WORD COUNT AND
     JST   WORD              GET NEXT EXTENDED WORD.
     STA*  CLOC              SAVE W(1-16) IN CURRENT LOCATION.
     IAB
     ARR   9                 EXTRACT AND TEST CONTROL BITS.
     SPL
     JMP   MR                RR1 - MEMORY REFERENCE.
     SLZ
     JMP   BCER              X10 - CODE ERROR.
     ARR   2
     SMI
     JMP   DONE+1            000 - GENERIC OR DATA, GO WRAP UP.
*
* DAC PROCESSOR.
*
     LRL   5                 100 - DAC SAVE L.S. 5 ADDR BITS.
     LDA*  CLOC              RETRIEVE M.S. 16 BITS OF EXTENDED WORD.
     ANA   ='140000          SAVE FLAG AND TAG BITS.
     IMA*  CLOC              SWAP WITH MS 16 BITS FO EXTENDED WRD
     LLR   5                 FINISH BASIC ADDRESS
     STA   TEMP              AND SAVE.
     CRA
     LRR   1                 EXTRACT AND
     SMI
     JMP   NREL              X0 - NOT RELOCATABLE.
     LRR   1                 RELOCATABLE - SAVE ASIGN' IN C.
     LDA   RF                GET RELOCATION FACTOR AND
     SSP                     REMOVE BLOCK RELOCATION INDICATOR.
     SRC                     CHECK RELOCATION 'SIGN).
     TCA                     IF MINUS, COMPLEMENT RELOCATION FACTOR.
NREL ADD   TEMP              ADD BASIC ADDRESS.
     STA   TEMP              *
     ERA*  CLOC              AND TAG
     ANA   TEMP              BITS
     ERA*  CLOC              *
     JMP   DONE              AND GO WRAP UP.
*
* MEMORY REFERENCE INSTRUCTION PROCESSOR.
*
MR   LGL   9                 GENERATE 14 BIT ADR WITH
     LRR   9                 RELOCATION BITS IN A(15-16).
     SLN                     TEST RELOCATION INDICATOR.
     JMP   NRMR              X0 - NOT RELOCATABLE.
     LGR   2                 SAVE RELOCATON 'SIGN' IN C.
     STA   TEMP              SAVE BASIC ADDRESS.
     LDA   RF                SET RELOCATION FACTOR AND
     SSP                     REMOVE BLOCK RELOCATION INDICATOR.
     SRC                     CHECK RELOCATION 'SIGN'.
     TCA                     IF MINUS, COMPLEMENT RELOCATION FACTOR.
     ADD   TEMP              ADD BASIC ADDRESS.
NRMC LRL   9                 EXTRACT SECTOR NUMBER AND
     SNZ                     CHECK FOR SECTOR ZERO REFERENCE.
     JMP   ZREF              CO - SECTOR ZERO REFERENCE.
     STA   TEMP              NOT SECTOR ZERO REFERENCE-
     LDA   CLOC              COMPARE SECTOR NUMBER WITH
     LGR   9                 CURRENT SECTOR (CLOC (3-7)).
     ERA   TEMP              NOTE SECTOR NUMBER IS SAVED IN TEMP
     SZE                     FOR USE DESECTORIZING PROCESSOR.
     ERA   TEMP              NOTE SECTOR NUMBER IS SAVED IN TEMP
     SZE                     FOR USE BY DESECTORIZING PROCESSOR.
     JMP   DSCT              NOT CURRENT SECTOR - DESECTORIZE.
```

```
      LDA*  CLOC               GET ORIGINAL INSTRUCTION WORD.
      LGR   10                 REMOVE HIGH-ORDER ADDRESS BITS
      SSM                      AND SET SECTOR BIT TO ONE.
ZRC   ALR   1                  POSITION SECTOR BIT.
      LLL   9                  ATTACH INTRA-SECTOR ADDRESS AND
      JMP   DONE               GO WRAP UP.
NRMR  LGR   2                  POSITION NON-RELOCATABLE ADDRESS
      JMP   NRMC               AND GO COMPLETE.
ZREL  LDA*  CLOC               GET ORIGINAL INSTRUCTION WORD.
      LGR   10                 REMOVE HIGH-ORDER ADDRESS AND CLEAR
      JMP   ZRC                SECTOR BIT THEN GO COMPLETE.
*
* DESECTORIZING PROCESSOR.
*
DSCT  LDA   TEMP               RECONSTRUCT ADDRESS.
      LRL   5                  SAVE FULL ADDRESS IN B(1-14).
      LDA*  CLOC               GET ORIGINAL INSTRUCTION AND
      ALR   2                  RIGHT-JUSTIFY FLAG AND TAG IN A.
      LRL   2                  COMPLETE ADDRESS LINK IN B(1-16).
      LGR   10                 RIGHT-JUSTIFY COMMAND AND
      ERA   ='15               TEST FOR LDX/STX.
      SZE
      LDA   ='040000           IF LDX/STX, CREATE MASK TO REMOVE
      ERA   ='137777           INDEX BIT FROM ADDRESS LINK.
      STA   TEMP               SAVE MASK.
      IAB                      GET ADDRESS LINK FROM B.
      ANA   TEMP               REMOVE INDEX BIT IF LDX/STX.
      IMA   TEMP               SWAP LINK WITH MASK.
      ERA   ='41000            MODIFY MASK TO CORRECT INSTRUCTION.
      ANA*  CLOC               MODIFY INSTRUCTION TAG.
      SSM                      FORCE INDIRECT
      STA*  CLOC               AND SAVE.
      LDA   LC                 GET CURRENT LINK COUNT.
      TCA                      COMPLEMENT,
      STA   0                  AND PLACE IN INDEX REGISTER.
      SNZ                      IF COUNT ZERO,
      JMP   NOL                SKIP SEARCH, OTHERWISE,
      LDA   TEMP               GET LINK AND
      CAS*  BASE               SEARCH LINKAGE TABLE
      JMP   *+2
      JMP   HIT                IF FOUND, PLACE ADDRESS
      IRS   0                  OF LINK IN INSTRUCTION WORD.
      JMP   *-4
NOL   LDA   BASE               IF LINK NOT IN TABLE,
      ERA   ='41000            CHECK FOR ROOM IN SECTOR
      SZE                      FOR ADDITION TO TABLE.
      JMP   ADDL               IF SPACE AVAILABLE, GO ADD LINK TO TABLE.
      LDA   ='140000           IF SECTOR ZERO IS FULL, GET ERROR FLAG
      JMP   BCER
ADDL  LRL   9                  SAVE LINK ADDRESS IN B(1-9).
      LDA   TEMP               ADD NEW LINK TO TABLE.
      STA*  BASE
      IRS   BASE               INCREMENT TABLE BASE
      IRS   LC                 AND LINK COUNT.
      JMP   HIT+3              GO FINISH INSTRUCTION.
HIT   LDA   BASE               LINK FOUND - FORM
      ADD   0                  LINK ADDRESS AND
      LRL   9                  SAVE IN B(1-9).
      LDA*  CLOC               GET INSTRUCTION WORD.
      LGR   9                  JOIN FLAG, TAG, OP CODE
      LLL   9                  AND ADDRESS.
*
* WRAP UP INSTRUCTION AND UPDATE CURRENT LOCATION AND WORD COUNT.
*
DONE  STA*  CLOC               PLACE COMPLETED INSTRUCTION IN MEMORY.
      IRS   CLOC               INCREMENT CURRENT LOCATION POINTER.
      LDA   WC                 GET WORD COUNT AND SUBTRACT
      SUB   =3                 3 (EFFECTIVELY 3/2) AND
      JMP   WCCK               CHECK FOR END OF RECORD.
*
* LOCATION FIELD PROCESSOR.
*
* THE LOCATION FIELD PROCESSOR READS THE EXTENDED WORD CONTAINING
* THE BLOCK ORIGIN.  IF THE CURRENT MODE OF LOADING IS RELOCATABLE,
* THE RELOCATION FACTOR IS ADDED TO THE BLOCK ORIGIN, AND THE
* BLOCK ORIGIN IS RETURNED IN A(1-16).
*
LOC   DAC   **                 ENTRY POINT.
      JST   WORD               GET LOCATION WORD.
      LLL   8                  RIGHT-JUSTIFY ADDRESS IN A
      STA   TEMP               AND SAVE TEMPORARILY.
      LDA   RF                 EXAMINE RELOCATION FACTOR, IF SIGN
      SPL                      BIT SET, NO RELOCATION SO ZERO
      CRA                      RELOCATION FACTOR.
      ADD   TEMP               ADD LOCATION AND RELOCATION FACTOR.
      JMP*  LOC                RETURN.
*
* PROCEDURE TO READ 24 BIT EXTENDED WORD. WORD IS RETURNED
* IN A(1-16), B(1-8), B(9-16) IS UNDEFINED.
*
WORD  DAC   **
      LDA   RSW                FLIP READ SWITCH FOR NEXT ENTRY.
      CMA
```

```
      STA    RSW
      SNZ                    TEST READ SWITCH TO DETERMINE WHETHER
      JMP    W2              FULL OR PARTIAL WORD MUST BE READ.
*
*                            READ FULL WORD PLUS PART OF NEXT WORD.
      JST    READ            READ M.S. 16 BITS
      STA    TEMP            AND SAVE.
      JST    READ            READ L.S. 8 BITS, M.S. 8 BITS OF NEXT WORD.
      STA    PART            SAVE M.S. 8 BITS OF NEXT WORD.
      IAB                    CONSTRUCT 24 BIT EXTENDED WORD.
      LDA    TEMP
      JMP*   WORD            RETURN
*
*                            COMPLETE PARTIAL WORD.
W2    JST    READ            READ L.S. 16 BITS OF WORD.
      IAB                    MOVE L.S. BITS TO B(1-16).
      LDA    PART            GET M.S. 8 BITS IN A(9-16).
      LLL    8               LEFT-JUSTIFY WORD.
      JMP*   WORD            RETURN
*
* READ 16 BIT WORD.
*
READ  DAC    **
      JST    CHAR            READ CHARACTER 1 (BITS 1-4)
      JST    CHAR            READ CHARACTER 2 (BITS 5-10)
      JST    CHAR            READ CHARACTER 3 (BITS 11-16)
      IAB                    MOVE COMPLETED WORD TO A(1-16).
      IMA    CKSM            INCLUDE CURRENT WORD IN CHECKSUM
      ERA    CKSM            (NOTE THAT THE SWAPPING PROCEDURE USED
      IMA    CKSM            LEAVE ORIGINAL 16 BIT WRD IN
      JMP*   READ            A FOR RETURN TO CALLING PROGRAM).
*
CHAR  DAC    **              READ AND TRANSLATE CHARACTER.
      JST    INPT            GET CHARACTER.
CHA1  LGL    8               LEFT JUSTIFY CHAR INA
      LLR    1               MOVE M.S. BIT (CHAN. 8) TO B.
      LGL    2               DISCARD CHANNEL 6 AND 7 DATA.
      SSC                    IF CHANNEL 6 WAS ZERO, NO
      JMP    NOTR            CHARACTER TRANSLATION IS NECESSARY.
      ARS    11              OTHERWISE RT JUSTIFY CHAR
      STA    0               AND PLACE IN INDEX.
      LDA    XTAB+4,1        GET CONVERTED CHARACTER FROM TABLE
NOTR  LLR    5               PUSH CHARACTER INTO B TO COMPLETE.
      JMP*   CHAR            RETURN.
*
* CHECK CHECKSUM AND FLAG ERROR.
*
CKCK  DAC    **
      LDA    CKSM            GET CHECKSUM AND
      SNZ                    CHECK FOR ZERO.
      JMP*   CKCK            IF ZERO, NO ERROR, RETURN.
      LDA    CLOC            IF NOT ZERO, GET CURRENT LOCATION
      SSM                    AND SET ERROR FLAG FOR DISPLAY
      JMP    BCER
      JMP*   CKCK            CONTINUE LOADING ON START.
* INPUT ROUTINE
*
INPT  DAC    **              ENTRY
      OCP    1               START READER.
      INA    '1001           INPUT TO A
      JMP    *-1             (DELAY, IF READER NOT READY)
      OCP    '101            STOP READER.
      JMP*   INPT            RETURN.
*
XTAB  OCT    024000          X05 REPLACES X74
      OCT    050000          X12 REPLACES X75
      OCT    104000          X21 REPLACES X76
      OCT    114000          X23 REPLACES X77
RF    BSS    1               RELOCATION FACTOR.
BASE  BSS    1               LINKAGE TABLE BASE.
LC    BSS    1               LINK COUNT.
CKSM  BSS    1               CHECKSUM.
RSW   BSS    1               READ CONTROL SWITCH.
TEMP  BSS    1               LOCAL TEMPORARY.
CLOC  BSS    1               CURRENT LOCATION.
WC    BSS    1               WORD COUNT.
PART  BSS    1               PARTIAL EXTENDED WORD.
*
* LITERALS
*
      FIN
*
TYP   DAC    TYPE
*
*TYPE ROUTINE.
*
      ORG    '3000
TYPE  PZE
      STA    TY7             SAVE A
      SKS    '104            CK ASR READY
      JMP    *-1
      OCP    '104            ENABLE OUTPUT
      LDA*   TYPE            MSG BEG ADR
```

```
      STA    TY9               STR ACCESS VECTOR
      IRS    TYPE
      LDA*   TYPE              WRD CNT
      IRS    TYPE
      SMI
      JMP    TY6
      STA    TY8               SET WRD CNTR
TY5   LDA*   TY9               2 CHAR
      JST    TY20
      IRS    TY9
      IRS    TY8
      JMP    TY5
      LDA    TY7
      JMP*   TYPE
TY6   TCA
      STA    TY8
      JST    CRLF
      JMP    TY5
TY20  PZE
      ICA                      INTERCH A
      OTA    4
      JMP    *-1
      ICA                      INTERCH A
      OTA    4
      JMP    *-1
      JMP*   TY20
*
*CARRIAGE RETURN LINE FEED.
*
CRLF  PZE
      LDA    ='106612          CRLF
      JST    TY20
      JMP*   CRLF
TY7   PZE
TY8   PZE
TY9   PZE
MS1   BCI    4,BAD TAPE
MS2   BCI    8,DAP16 SUBR LOAD
MS3   BCI    7,INSERT SUBR TA
      BCI    8,PE IN HS READER
MS4   BCI    8,MODIFY SUBR AS D
      BCI    3,ESIRED
      OCT    106612
      BCI    8,RESTART AT 2034
      BCI    3,OCTAL
MS5   BCI    8,SELECT SUB NUM
MS6   BCI    6,SUBR LOADED
MS8   BCI    8,DISC NOT ON LINE
      FIN
      END
*
      ORG    '4000
      EXA
      JMP    *+1
      JST    MA
      HLT
      JMP    *-2
MA    PZE
      EXA
      JMP    *+1
      JST*   TYP
      DAC    MS1               MESSAGE ASSIGNMENT
      DEC    9
      JST    ONL
      JST*   TYP
      DAC    MS2               INSERT ASSIGN TAPE IN HS READER
      DEC    16
      CRA
      HLT
MA5   JST    RN
      STA    DSU
      JST    RN                INPUT CONTACT NUM
      STA    CONT
      JST    RN                INPUT MSG NUM
      STA    MSGN
      JST    RN
      STA    SUBN
      JST    SPTR              STR MESSAGE POINTER
      JMP    MA5
MA8   JST*   TYP
      DAC    MS3               ASSIGNMENT COMPLETE
      DEC    10
      JMP*   MA
*
* CHECK DISC ON LINE
*
ONL   PZE
NL1   SKS    '1021
      JMP    *+2
      JMP*   ONL
      JST*   TYP
      DAC    MS4               DISC NOT ON LINE
      DEC    8
      HLT
      JMP    NL1
```

```
*
* HS READER DECIMAL INPUT. COMMA SIGNALS END OF NUM.
* X-OFF TERMINATES INPUT AND PROGRAM
*
RN   PZE
RN1  CRA
     STA   RN3
RN2  JST   RIN
     CAS   RU
RU   OCT   377
     JMP   RN1
     CAS   ='254
     JMP   *+2
     JMP   RNEX
     CAS   ='223            X-OFF
     JMP   *+2
     JMP   HAB
     JST   VDN              CK FOR VALFD DEC CHAR
     STA   RN4
     LDA   RN3
     MPY   =10
     IAB
     ADD   RN4
     STA   RN3
     JMP   RN2
RNEX LDA   RN3
     JMP*  RN
RN3  PZE
RN4  PZE
*
* CHECK FOR VALID DEC CHAR, CONVERT TO BINARY.
*
VDN  PZE
     CAS   ='260
     JMP   *+3
     JMP   *+5
     JMP   RN2
     CAS   ='271
     JMP   RN2
     JMP   *+1
     SUB   ='260
     JMP*  VDN
*
* INPUT ONE CHARACTER FROM HIGH SPEED READER.
*
RIN  PZE
     OCP   1
     INA   '1001
     JMP   *-1
     OCP   '101
     JMP*  RIN
*
* COMPUTE AND STORE MESSAGE POINTER ON DISC.
*
SPTR PZE
     LDA   USU
     LGL   5                MPY BY 32
     ADD   ='10000          BASE TRK 16
     STA   TSEC
     JST   DR               READ IN PTR TABLE
     LDA   CONT             CONTACT NUMBER
     ADD   BUFF             COMPUTE PTR STR VEC
     STA   PSV
     LDA   MSGN             MSG NUM
     SNZ
     JMP   SP5
     ADD   ='22000          ADD BASE TRK 36
SP5  STA*  PSV              STR MSG PTR
     LDA   PSV              COMPUTE SUBROUTINE PTR
     ADD   =256
     STA   PSV
     LDA   SUBN
     SNZ
     JMP   SP9
     LGL   3                MPY BY 8
     ADD   ='25400          ADD BASE TRK 43 SEC 64
SP9  STA*  PSV              STORE SUB POINTER
     JST   DW               WRITE POINTERS BACK ON DISC
     JMP*  SPTR
*
* DISC READ ROUTINE.
*
DR   PZE
DR1  LDA   BUFF
     SSM
     STA   '20              BEG ADR
     ADD   =511
     STA   '21              SET END ADR
     LDA   TSEC             STRT TRK/SEC
     SKS   '121             CK READY
     JMP   *-1
     OCP   '321             GIVE INTERLACE
     OTA   '21
```

```
        JMP    *-1
        SKS    '121            WAIT FOR READ
        JMP    *-1
        SKS    '621
        JMP    *+2
        JMP*   DR
        JST*   TYP
        DAC    MS5             DISC PARITY AFTER READ
        DEC    11
        JMP    DR1
*
* WRITE POINTERS BACK ON FISC
*
DW      PZE
DW1     LDA    BUFF            BUFFER BEG ADR
        STA    '20             SET BEG
        ADD    =511
        STA    '21             SET END
        LDA    TSEC
        SKS    '121            CK DISC READY
        JMP    *-1
        OCP    '321            INTERLACED
        OCP    '521            WRITE
        OTA    '21
        JMP    *-1
        SKS    '121            WAIT FOR WRITE
        JMP    *-1
        JMP*   DW
DSU     PZE
CONT    PZE                    CONTACT NUMBER 0-255
MSGN    PZE
TSEC    PZE
SUBN    PZE
BUFF    DAC    BUF
BUF     EQU    '5000           POINTE- BUFFER
PSV     PZE                    POINTER STORAGE VECTOR
TYP     DAC    TYPE
*
*TYPE ROUTINE.
*
TYPE    PZE
        STA    TY7             SAVE A
        SKS    '104            CK ASR READY
        JMP    *-1
        OCP    '104            ENABLE OUTPUT
        LDA*   TYPE            MSG BEG ADR
        STA    TY9             STR ACCESS VECTOR
        IRS    TYPE
        LDA*   TYPE            WRD CNT
        IRS    TYPE
        SMI
        JMP    TY6
        STA    TY8             SET WRD CNTR
TY5     LDA*   TY9             2 CHAR
        JST    TY20
        IRS    TY9
        IRS    TY8
        JMP    TY5
        LDA    TY7
        JMP*   TYPE
TY6     TCA
        STA    TY8
        JST    CRLF
        JMP    TY5
TY20    PZE
        ICA                    INTERC  A
        OTA    4
        JMP    *-1
        ICA                    INTERC  A
        OTA    4
        JMP    *-1
        JMP*   TY20
*
*CARRIAGE RETURN LINE FEED.
*
CRLF    PZE
        LDA    ='106612        CRLF
        JST    TY20
        JMP*   CRLF
TY7     PZE
TY8     PZE
TY9     PZE
        FIN
MS1     BCI    9,MESSAGE ASSIGNMENT
MS2     BCI    7,INSERT ASSIGN
        BCI    9,TAPE IN HS READER
MS3     BCI    6,ASSIGNMENT C
        BCI    4,OMPLETE
MS4     BCI    8,DISC NOT ON LINE
MS5     BCI    6,DISC PARITY
        BCI    5,AFTER READ
        END
```

```
*
TYPP EQU    '100
ADTK EQU    '101          ADD TASK VEC
DHO  EQU    '112
DRU  EQU    '116
LOG  EQU    '130
OUTL EQU    '131          OUTPUT AND LOG VEC
MDMC EQU    '146
LAST EQU    '157
MON  EQU    '136
DAY  EQU    '137
YEAR EQU    '140
HOUR EQU    '141
MIN  EQU    '142
SEC  EQU    '143
QXT  EQU    '270          QUEUE EXIT
BUSY EQU    '301
ON   EQU    '306
TTOF EQU    '312
PINK EQU    '315          PRIORITY INT MASK
DBYO EQU    '327
LUGF EQU    '336
PAF  EQU    '47000        PREVIOULY ACTIVE FLAGS
CAF  EQU    '47200        CURRENTLY ACTIVE FLAGS
PTBF EQU    '50000        POINTER BUFFER 50,000TO 50,777
SUPT EQU    '50400        SUBROUTINE POINTER BUFFER
SUBF EQU    '37000        SUBROUTINE BUFFER
SERB EQU    '37200        SERIAL NUMBER BUFFER
DIDD EQU    '47400        DSU ID BUFFER
     ORG    '200
NORM PZE
SS18 DAC    X18           Q-ED BY ACTION SUBROUTINES
CLR  DAC    CLRR          CLR AREA ADR
SNUM PZE                  SERIAL NUMBER FOR ERR MSGS
BNUM PZE                  BIT NUMBER
BP   PZE                  BIT POSITION STR
CT11 PZE
ES32 PZE                  STR1 TRK/SEC FOR MSG PTRS
PTRB DAC    PTBF
ESCN PZE                  1=EOS .0 =EOB
DSUA PZE                  DSU ADR
ES31 PZE                  DSU ADR STR
DSCA PZE
BCTR PZE                  BIT SHIFT COUNTER
STMM DAC    STMN
GT   DAC    GTIM
WNUM PZE                  WRD CNTR
     PZE                  SPARE
STAT PZE                  INT STATUS
CAFA DAC    CAF
AS3  DAC    ASC
DWA  DAC    DA            DISC WORD AREA VEC
TM   PZE                  MONITOR MASTER TASK
T3   DAC    TT3
MT50 PZE                  INT STATUS WRD STR
BF1  DAC    BFF1          MON BUF 1 VEC
PAFA DAC    PAF
LOGV PZE                  LOG BUFFER STR VEC
LOGB DAC    LGBB          LOG BUFFER ADDR
LGND DAC    LGBB+174      LOG BUFFER END ADR
CHNG PZE                  CHANGE THIS PASS FLAG
EOSS DAC    EOS
LNUM DAC    LGBB-1        ADR OF NUM OF MON LOG WRDS
CH1  PZE                  SET WHEN DATE/TIME HAS BEEN TYPED
ERSH PZE                  ERROR STATUS SHIFT STR
DPP  DAC    DP
DPC  PZE                  DISC PARITY COUNTER
DRD  PZE                  DISC READ RE-Q ADR
CH2  PZE                  CHNG HAS OCCURRED THIS DSU
CRRL DAC    CLAR
CR   DAC    CRRR
TMM  PZE
E68  DAC    ES68          WAIT FOR TYPE VEC
SNM  PZE                  TEMP SER NUM STR
NL   BCI    1,NL
OP   BCI    1,OP
M2C  DAC    MS2C
RSET DAC    RST           RESET SCNR VEC
ASRB PZE                  SET WHEN ASR USED THIS SCAN
     PZE                  SPARE
LCKA DAC    LCK
TMMM PZE
SCDD DAC    SCND
OFF  PZE                  MONITOR OFF FLAG
OFFF DAC    OF
     ORG    '44000
PM   PZE                  TIME SHARE COTROL EXECUTION ADDR
     PZE
     LDA    ON
     SZE                  IS MONITOR ALREADY ON
     JMP    MMON          YES
     IRS    ON            SET MONITOR ON FLAG
```

```
     LDX    =-256
     CRA                       CLR PAF AND CAF
     STA*   PM5,1
     IRS    0
     JMP    *-2
     STA    SNUM               CLR SER NUM
     STA    ASRB
     STA    OFF
     LDA    INI9               INT PTOG ADR
     STA    '71
     LDA    =-10
     STA    DPC                SET DISC PARITY CNRT
     LDA    MDMC               CHNL
     ADD    OCP1               SET MON SCN TO 1ST ADR
     STA    OCP2
     JST    RST
     LDA    ME-1
     JMP    QXT
MMON CRA
     STA    BUSY
     JMP*   PM+1               EXIT
T1   DAC    TT1
PM5  DAC    PAF+256
INT9 DAC    MINT
OCP1 OCP    '240               SET MON SCN TO 1ST ADR
*
*RESET SCANNER TO FIRST ADDRSSS.
*
RST  PZE
OCP2 OCP    '246               SET MON SCN TO 1ST ADR
     JMP*   RST
*
*TYPE MONITOR ON.
*
     DAC    ME
ME   PZE
     PZE
     JST*   TYPP
     DAC    MS22               MONITOR ON
     DEC    5
     LDA    M1-1               Q CLR BUSY
     STA    TMM
     LDA    E68                Q WAIT FOR TYPEOUT
     JMP    QXT
*
*CLEAR BUSY FLAG.
*
     DAC    M1
M1   PZE
     PZE
     CRA
     STA    BUSY
     LDA    T1
     JMP    QXT
*
*CLEAR STATUS AREA OF DISC.
*
TT1  PZE
     PZE
     LDA    =-8
     STA    CTR                SET CLR DISC CNTR
     LDA    ='16200            BASE TRK 28 SEC 128
     STA    TSEC               SET BEGINNING TRACK AND SEC
     LDA    T4
     STA    TM
     LDA    T2
     STA    DRD                Q THIS TASK IF DISC PARITY
     JMP    QXT
T4   DAC    TT4
CTR  PZE                       CNTR
TSEC PZE
*
*CLEAR 256 WORDS ON DISC.
*
TT2  PZE
     PZE
     LDA    DBYO
     SZE
     JMP    R2
     LDA    TSEC               STRT TRK/SEC
     JST*   DWO                DISC WRITE
     DAC    PAF                CLR AREA ADDRESS
     DEC    256                CLR 16 SECTORS
     LDA    T3
     JMP    QXT
R2   LDA    T2                 RE-Q
     JMP    QXT
T2   DAC    TT2
*
*CHECK DISC BUSY,RE-Q MAIN MONITOR.
*
TT3  PZE
     PZE
```

```
      SKS    '121              SKP IF DISC CONTROLLER READY
      JMP    R3                NOT READY
      LDA    DPP               Q DISC PARITY CK
      JMP    OXT
R3    LDA    T3                RE-Q
      JMP    OXT
*
*INCREMENT DISC CLR CNTR.
*
TT4   PZE
      PZE
      IRS    CTR
      JMP    KU2               Q TO CLR ANOTHER 256 WRDS
      LDA    T5
      JMP    OXT
KU2   LDA    TSEC              BUMP STRT TRK SEC
      ADD    =16
      STA    TSEC
      LDA    T2
      JMP    OXT
T5    DAC    TT5
*
*SET UP FOR MONITOR INPUT.ENABLE INT.START SCAN.
*
TT5   PZE
      PZE
      LDA    MDMC              MONITOR DMC CHNL
      SUB    =1                COMPUTE DMC STRT ADR
      LGL    1                 MPY BY 2
      ADD    ='20
      STA    T55
      STA    T56               SAVE BIRGIN STRT ADR VEC
      LDA    BF1
      SSM
      STA*   T55
      ADD    =16               COMPUTE END ADR
      IRS    T55
      STA*   T55               SET END ADR
      LDA    OCP5              STRT MON SCN OCP
      ADD    MDMC              ADD DMC CHNL NUM
      STA    STM5
      LDA    INA5
      ADD    MDMC              ADD DMC CHNL NUM
      STA    MT2
      JST    GTIM              GET TIME
      INH
      LDA    PINK              PRIORTIY INT MASK
      ANA    ='175777          CLR INT 6 BIT
      ADD    ='2000            SET INT 6 BIT
      STA    PINK
      OTA    '120
      ENB
      JST    STMN              STRT MON SCANNER
      JMP*   TT5+1
OCP5  OCP    '40               STRT MON SCNR
INA5  INA    '1140             INPUT STATUS WORD
T55   PZE
T56   PZE                      STRT ADR LOCATION OF MON DMC
*
*START MONITOR SCANNER.
*
STMN  PZE
STM5  OCP    '46
      JMP*   STMN
*
*MONITOR SCANNER INTERRUPT PROGRAM.WED 970622.
*
MINT  PZE
      INH
      STA    MT53
      CRA
      ACA
      STA    MT54              SAVE C BIT
MT2   INA    '1146             NPUT STATUS WORD
      JMP    *+1
      STA    MT50              SAVE STATUS WORD
      JST    DMCR              SET DMC FOR NEXT BUFFER
      LDA    MT52              ADR FO TASK
      STA*   LAST
      STA    LAST
      CRA
      STA*   LAST
      LDA    MT54
      ARS    1                 RESTORE C BIT
      LDA    MT53              RESTURE A
      ENB
      JMP*   MINT
MT52  DAC    PMIN              MON SCANNER TASK VEC
MT53  PZE                      A STR
MT54  PZE
*
*SET MONITOR DMC FOR INPUT.
*
```

```
DMCR PZE
     LDA   156              VEIGIN BEG ADR WRD
     STA   DM10
     LDA   BF1              BUF 1 BEG ADR
DM3  SSM
     STA*  DM10             SET DMC BEG ADR
     IRS   DM10
     ADD   =16
     STA*  DM10             SET DMC END ADR
     JMP*  DMCR             EXIT
DM10 PZE
BFF1 BSS   17               MONITOR INPUT BUFFER
*
* GET DATE AND TIME, CONV TO ASCII. STORE IN MS2 PRNT BUFFER.
*STORE TIME AND DATE IN LOG BUFFER.
*
GTIM PZE
     LDA   LOGB             LOG BUF ADR
     STA   LOGV             SET LOG BUFFER STR VEC
     CRA
     STA   CH1              CLEAR 1ST CHNGE FLAG
     STA   ESCN             CLR EOS FLAG
     STA   CHNG
     STA   NORM
     STA   ASRB
     LDA   MON              BINARY MONTH
     STA*  LOGV             STORE IN LOG BUFFER
     IRS   LOGV
     JST*  AS2              CALL 2 DIG BIN TO ASCII
     STA   MS2              STR MON IN MSG
     LDA   DAY              BINARY DAY
     STA*  LOGV             STORE IN LOG BUFFER
     IRS   LOGV
     JST*  AS2              CALL 2 DIG BIN TO ASCII
     STA   MS2+2            STR DAY IN MSG
     LDA   YEAR
     STA*  LOGV             STORE IN LOG BUFFER
     IRS   LOGV
     JST*  AS2              CALL 2 DIG BIN TO ASCII
     STA   MS2+4            STR YR IN MSG
     LDA   HOUR
     STA*  LOGV             STORE IN LOG BUFFER
     IRS   LOGV
     JST*  AS2              CALL 2 DIG BIN TO ASCII
     STA   MS2+6            STR HR IN MSG
     LDA   MIN
     STA*  LOGV             STORE IN LOG BUFFER
     IRS   LOGV
     JST*  AS2              CALL 2 DIG BIN TO ASCII
     STA   MS2+8
     JMP*  GTIM             EXIT
AS2  DAC   ASCC
MS2  PZE                    MONTH
     OCT   127657           2 SLASHES
     PZE                    DAY
     OCT   127657           2 SLASHES
     PZE                    YEAR
     OCT   120240           2 SPACES
     PZE                    HOURS
     OCT   120240           2 SPACES
     PZE                    MINUTES
     OCT   120240
     PZE                    SECONDS
MS2A BCI   2,               SERIAL NUM ASCII SPACE
MS2B BCI   9,ERR MSG
     BCI   1,               2 SPACES
MS2C BCI   3,OP             OP,NL
MS2D BCI   3,DSU            DSU ID
MS2E BCI   3,BIT
*
*PROCESS MONITOR INTERRUPT,WED 970622.
*
PMIN PZE
     PZE
     LDA   MT50             INT STATUS WORD
     CAL
     STA   STAT
     LDA   MT50             INT STATUS WORD
     ICA                    INTERCH A
     ANA   ='177
     STA   DSUA
     LDA   STAT
     ANA   ='10             ISO NOM EOB
     SZE                    NOR EOB
     JMP   PM3              YES
     LDA   STAT
     ANA   ='40
     SZE                    EOS
     JMP   PM10             YES
PM2  JST   ERR              NO
     JMP*  PMIN+1           EXIT
PM3  LDA   STAT
     ANA   ='327
```

```
      SZE
      JMP    PM7
      LDA    DSUA
      ADD    ='16200              COMPUTE DISC ADR OF STATUS INFO
      STA    DSCA                 SAVE DISC ADR
*SET CURRENTLY ACTIVE FLAG.
      LDA    DSUA                 DSUA DR
      ADD    CAFA                 COMPUTE CAF ADR
      STA    PM8
      IRS*   PM8                  SET CUR ACT FLG THIS DSU
*READ PREVIOUS DATA FROM DISC
      LDA    PM9
      JMP    QXT
PM7   JST    ERR
      JMP*   PMIN+1
PM8   PZE
PM9   DAC    BE7
PM10  LDA    STAT
      ANA    ='337
      SZE                         EOS ONLY
      JMP    PM2                  NO
      LDA    EOSS                 Q EOS PROCESS
      JMP    QXT
*
*TYPE OUT MONITOR SCANNER ERRORS.
*
ERR   PZE
      LDA    OFF
      SZE
      JMP*   OFFF
      SR2
      JMP    RR2
ERRC  SR3
      JMP    RR                   DONT TYPE ERRORS
      LDA    DSUA
      JST*   AS3                  CALL 3 DIG BIN TO ASCII
      STA    MS3+2
      IAB
      STA    MS3+3
      LDA    MT50                 ERROR STATUS
      STA    ERSH                 STR IN SHIFT WORD
      LDA    ER1-1                Q DSU TYPE OUT
ERRA  JST*   ADTK
      JMP*   ERR
RR    LDA    ER8-1                Q EOS CK
      JMP    ERRA
RR2   LDA    STAT
      ANA    ='335
      SZE
      JMP    ERRC
      JMP    RR
*
* TYPE OUT DSU AND USU ADDRESS FOR ERROR CONDITION.
*
      DAC    ER1
ER1   PZE
      PZE
      LDA    BUSY
      SZE
      JMP    ER1B                 RE-Q
ER1A  JST*   OUTL
      DAC    MS3                  DSU XXX
      DEC    4
      DAC    ER2
      IRS    ASRB
      JMP*   ER1+1                EXIT
ER1B  LDA    ASRB
      SZE
      JMP    ER1A
      LDA    ER1-1                RE-Q
      JMP    QXT
*
* TYPE SUNC ERR IF ANY.
*
      DAC    ER2
ER2   PZE
      PZE
      LDA    ERSH
      ARS    1
      STA    ERSH
      SSC
      JMP    ER2A                 Q NO RESPONSE CK
      JST*   OUTL
      DAC    MS4                  SYNC ERR
      DEC    9
      DAC    ER3
      JMP*   ER2+1
ER2A  LDA    ER3-1                Q NO RESPONSE CK
      JMP    QXT
*
* TYPE NO RESPONSE
*
```

```
     DAC   ER3
ER3  PZE
     PZE
     LDA   ERSH
     ARS   1
     STA   ERSH
     SSC
     JMP   ER3A              Q ABNORMAL EOB
     SR2
     JMP   ER3A
     JST*  OUTL
     DAC   MS5               NO RESPONSE
     DEC   9
     DAC   ER4
     JMP*  ER3+1             EXIT
ER3A LDA   ER4-1             Q ABNORMAL EOB
     JMP   QXT
*
* YYPE ABNORMAL END OF BLOCK.
*
     DAC   ER4
ER4  PZE
     PZE
     LDA   ERSH              ERR SHIFT WORD
     ARS   1
     STA   ERSH
     SSC
     JMP   ER4A
     JST*  OUTL
     DAC   MS6               ABNORMAL EOB
     DEC   9
     DAC   ER5
     JMP*  ER4+1             EXIT
ER4A LDA   ER5-1             QMULT CONC XMT
     JMP   QXT
*
* TYPE MULT CONC XMITTING.
*
     DAC   ER5
ER5  PZE
     PZE
     LDA   ERSH              ERR SHIFT WORD
     ARS   2
     STA   ERSH
     SSC
     JMP   ER5A
     JST*  OUTL
     DAC   MS7               MULT CONC XMT
     DEC   9
     DAC   ER6
     JMP*  ER5+1             EXIT
ER5A LDA   ER6-1             Q INPT SWITCHED
     JMP   QXT
*
* TYPE INPUT SWITCHED.
*
     DAC   ER6
ER6  PZE
     PZE
     LDA   ERSH              ERR SHFT WRD
     ARS   2
     STA   ERSH
     SSC
     JMP   ER6A              Q ILLEGAL XMISSION
     JST*  OUTL
     DAC   MS8               INPUT SWITCHED
     DEC   9
     DAC   ER7
     JMP*  ER6+1             EXIT
ER6A LDA   ER7-1             Q ILLEGAL DSU XMISSION
     JMP   QXT
*
* TYPE ILLEGAL DSU XMISSION.
*
     DAC   ER7
ER7  PZE
     PZE
     LDA   ERSH
     ARS   1
     SSC
     JMP   ER7A              Q EOS CK
     JST*  OUTL
     DAC   MS9               ILLEGAL DSU XMISSION
     DEC   10
     DAC   ER8
     JMP*  ER7+1             EXIT
ER7A LDA   ER8-1             Q EOS CK
     JMP   QXT
*
* CHECK FOR EOS.
*
```

```
      DAC   ER8
ER8   PZE
      PZE
      LDA   STAT
      ANA   ='40
      SNZ                   EOS
      JMP   ER8C            NO RESTART SCANNER
      LDA   STAT            YES
      ANA   ='337
      SNZ                   EOS ONLY
      JMP   ER8B            YES
      LDA   DSUA            NO SET CUR ACT FLG THIS DSU
      ADD   CAFA
      STA   PM8
      IRS*  PM8
ER8B  LDA   EOSS            Q EOS PROCESS
      JMP   QXT
ER8C  JST*  STMM            RE START SCANNER
      JMP*  ER8+1
      OCT   1
      DEC   4
MS3   BCI   2,DSU
      BSS   2
*
*TWO DIGIT OCTAL TO ASCII CONVERSION.
*
ASCC  PZE
      STA   AS9
      IAB
      CRA
      DIV   =10
      ADD   ='260
      LGL   8
      STA   AS8
      IAB
      ADD   ='260
      ADD   AS8
      STA   AS8
      JMP*  ASCC
AS8   PZE
AS9   PZE
MS22  BCI   5,MONITOR ON
      FIN
      ORG   '45000
M2A   DAC   MS2A
      DAC   MS2A+1
TS1   PZE                   TEMP STR
M2D   DAC   MS2D
      DAC   MS2D+1
M2E   DAC   MS2E
      DAC   MS2E+1
SUBB  DAC   SUBF
SUBX  DAC   SUBF            FOR QUEING ERROR SUB FOR EXEC
CT10  PZE                   WORD CNTR FOR PORC EOS
CHRR  PZE                   DSU ADR STR
CLRR  BSS   16              CLEAR AREA AND WORK AREA
ES20  PZE                   PREV ACTIVE PROCESS ADR
ES21  PZE                   CUR ACT PROC ADR
ES30  PZE
ES50  PZE
ES51  PZE
SBPT  DAC   SUPT
MSGP  PZE                   MSG PTR BEG TRK/SEC
SUBP  PZE                   SUBROUTINE PTR BEG TRK/SEC
*
*PROCESS END-OF-SCAN INTERRUPT.
*
EOS   PZE
      PZE
      LDA   OFF
      SZE
      JMP*  OFFF
      IRS   NORM            SET NORMAL FLAG TO NORMAL
      LDA   CAFA            CURRENT FLAG TABLE ADR
      STA   ES21
      IRS   ESCN            SET EOS/EOB FLAG TO EOS
      LDA   PAFA            PREV FLAG TABLE ADR
      STA   ES20
      LDA   =-100
      STA   CT10            SET FLAG COUNTER
      JST   CLAR            CLR WORK AREA
      LDA   ES3-1
      JMP   QXT
*
*CLEAR THE WORK AREA.
*
CLAR  PZE
      LDX   =-16
      CRA
CL20  STA*  CL30,1
      IRS   0
      JMP   CL20
      JMP*  CLAR
```

```
CL30 DAC   CLRR+16
*
*CHECK PREVIOUS AND CURRENT ACTIVE FLAGS.
*
     DAC   ES3
ES3  PZE
     PZE
     LDA*  ES20              PREV ACT FLAG
     SNZ
     JMP   ES3A              PREV ACT NOT SET
     LDA*  ES21              CUR ACT
     SZE
     JMP   ES3A              CLR CUR ACT
     LDA   ES5-1             PREV ACT SET
     JMP   OXT
ES3A LDA*  ES21              CRUURNTLY ACT FAG
     IMA*  ES20              UPDATE PREV WITH CUR
     CRA
     STA*  ES21              CLR CUR ACT
     LDA   ES4-1
     JMP   OXT
*
*INCREMENT FLAG ACCESS ADDRESSES AND COUNTER.
*
     DAC   ES4
ES4  PZE
     PZE
     IRS   ES20              INCR PREV ACT ADR
     IRS   ES21              INC R CUR ACT ADR
     IRS   CT10              INC FLAG CNTR
     JMP   ES4B
     JST   OTLB
     JMP*  ES4+1             EXIT
ES4B LDA   ES3-1
     JMP   OXT
*
*OUTPUT LOG BUFFER.
*
     DAC   OTLB
OTLB PZE
     LDA   CHNG
     SNZ
     JMP   OT5
     LDA   LOGV              LOG STR VEC
     SUB   LOGB              SUB LOG BUF BEG ADDR
     STA*  LNUM              STR NUM OF WRDS TO LGO
     ADD   =2
     STA   LB5
     LDA   LB-1              Q LOG MON DATA ROUTINE
OT3  JST*  ADTK
     JMP*  OTLB              EXIT
OT5  LDA   SCDD              Q SCN END RE-INIT
     JMP   OT3
*
*LOG MONITOR BUFFER.
*
     DAC   LB
LB   PZE
     PZE
     LDA   LOGF              LOG FLAG
     SZE
     JMP   LB7
     JST*  LOG
     DAC   LGBB-2            MONITOR DATA
LB5  DEC   0                 PRE LOADED WITH NUM OF LOG BUF WRDS
     LDA   SCDD              Q SCN END RE-INIT
     STA   THMM
     LDA   LCKA              Q CK BUSY LOGGING
     JMP   OXT
LB7  LDA   LB-1              RE-Q
     JMP   OXT
*
*COMPUTE PREVIOUS DATA DISC ADR.Q PREV DATA PREV DATA READ.
*
     DAC   ES5
ES5  PZE
     PZE
     LDA*  ES21              CUR ACT
     IMA*  ES20              UPDATE PREV WITH CUR
     CRA
     STA*  ES20              CLR CURRENT
     LDA   CT10              COMPUTE PREV INPT TRK-SEC
     ADD   =100
     STA   ES31              SAVE DSU NUM
     ADD   ='16200           TRK SEC ADR IN A
     STA   ES30
     LDA   EX5-1             Q PREV DATA READ
     STA   DRD               Q THIS IF PARITY ERR
     JMP   OXT
*
*READ PREVIOUS DATA FROM DISC.
*
```

```
      DAC    EX5
EX5   PZE
      PZE
      LDA    DBYO
      SZE
      JMP    EX5B             RE-Q
      LDA    ES30
      JST*   DHO
      DAC    DA
      DEC    16
      LDA    CLL-1            CLR SAME DISC AREA
      STA    TH
      LDA    T3               Q DISC READY CHECK
      JMP    QXT
EX5B  LDA    EX5-1            RE-Q THIS TASK
      JMP    QXT
*
*CLEAR 1 SECTOR ON DISC AND RE-Q INCH ROUTINE.
*
      DAC    CLL
CLL   PZE
      PZE
      LDA    DBYO
      SZE
      JMP    CLLB
      LDA    ES30             BEG TRK/SEC
      JST*   DHO              CALL DISC WRITE
      DAC    CLRR
      DEC    16
      LDA    CLX-1            Q XFER TO LOG BUFFER
      STA    TH
      LDA    T3               Q CISC READY CK
      JMP    QXT
CLLB  LDA    CLL-1            RE-Q THIS TASK
      JMP    QXT
*
*XFER CLEAR AREA TO LOG BUFFER.
*
      DAC    CLX
CLX   PZE
      PZE
      JST*   CRRL             CLR CLR AREA
      LDA    =-17
      STA    CX7              SET XFER CNTR
      LDA    CR
      STA    CX5              SET ACCESS VEC
      LDA    ES31             DSU ADR
      STA*   CR
CX2   LDA*   CX5
      STA*   LOGV
      IRS    LOGV
      IRS    CX5
      IRS    CX7              INCR XFER CNTR
      JMP    CX2
      LDA    ES10-1           Q NEXT TASK
      JMP    QXT
CX5   PZE
CX7   PZE
*
*PROCESS CHANGE NOTED AT EOS TIME.
*
      DAC    ES10
ES10  PZE
      PZE
      LDA    =-16
      STA    CT11             SET WORD CNTR
      CRA
      STA    WNUM             CLR WRD NUM
      LDA    DWA
      STA    ES50
      LDA    CLR
      STA    ES51
      LDA    E10A-1
      JMP    QXT
      DAC    E10A
E10A  PZE
      PZE
      LDA*   ES50             PREV INPUT WRD
      CAS*   ES51
      JMP    E10C
      JMP    *+2
      JMP    E10C
      LDA    ES11-1
      JMP    QXT
E10C  CRA
      STA    BNUM
      LDA    =-16
      STA    BCTR             SET BIT CNRT
      LDA    ES12-1
      JMP    QXT
*
*WORD COUNTER INCREMENT ROUTINE.
*
```

```
      DAC    ES11
ES11 PZE
      PZE
      IRS    ES50              INCH WRD ACCSS VEC
      IRS    WNUM              INCH WRD NUM
      IRS    CT11              INCH WRD CNTR
      JMP    E11H              GET NEXT WORD
      LDA    ES4-1
      JMP    QXT
E11H LDA     E10A-1
      JMP    QXT
*
*PROCESS EOS WORD DIFFERENCE.
*
      DAC    ES12
ES12 PZE
      PZE
      LDA*   ES50              PREV WORD
      STA    E14D              STR PREV WRD FOR SHIFTING
      LDA    E14A-1
      JMP    QXT
*
*CHECK FOR BIT CHANGE.
*
      DAC    E14A
E14A PZE
      PZE
      LDA    OFF
      SZE
      JMP*   OFFF
E14B LDA     E14D
      LGL    1
      STA    E14D
      SSC
      JMP    E14C              BIT IS 0
      IRS    CHNG              SET CHNG THIS PASS FLAG
      LDA    ES16-1
      JMP    QXT
E14C LDA     E15-1
      JMP    QXT
E14D PZE                       WORD TO BE SHIFTED
*
*INCREMENT BIT COUNTER AND BIT NUMBER
*
      DAC    E15
E15   PZE
      PZE
      IRS    BNUM              INCR BIT NUM
      IRS    BCTR              INCR BIT COUNTER
      JMP    E15B
      LDA    ES11-1            FINISHED THIS WORD
      JMP    QXT
E15B LDA     E14A-1
      JMP    QXT
*
*COMPUTE BIT POSITION.
*
      DAC    ES16
ES16 PZE
      PZE
      LDA    WNUM              COMPUTE BIT POSITION
      LGL    4                 MPY BY 16
      ADD    BNUM              BIT POSITION IN A
E16B STA     BP                STR BIT POSITION
      LDA    ES31              DSU ADR
      LGL    5                 MPY BY 32
      ADD    ='10000           BASE TRK 16
      STA    ES32              COMPUTE STRT TRK/SEC FOR
      LDA    ES17-1            THIS DSU.
      JMP    QXT
*
*READ IN POINTERS FROM DISC.
*
      DAC    ES17
ES17 PZE
      PZE
      LDA    DBYO              CK BUSY FLAG
      SZE
      JMP    E17B              RE-Q THIS TASK
      LDA    ES32              PTR STRT TRK/SEC
      JST*   DRO               CALLL DISC READ
      DAC    PTBF
      DEC    512
      LDA    ES18-1            Q NEXT TASK AFTER READY
      STA    TM
      LDA    T3
      JMP    QXT
E17B LDA     ES17-1
      JMP    QXT
*
*GET MSG  AND SUBROUTINE PTRS.
*
```

```
      DAC    ES18
ES18 PZE                       MSG/SUB PTRS IN CORE
      PZE
      LDA    PTRB              PTR BUF ADR
      ADD    BP                BIT POS
      STA    E18F
      LDA*   E18F              MSG PTR
      STA    MSGP              STR MSG PTR
      LDA    SBPT              SUB PTR TABLE ADR
      ADD    BP                BIT POS
      STA    E18F
      LDA*   E18F
      STA    SUBP              STR SUBR PTR  THIS DSU
      SNZ
      JMP    E18B              GO CHECK FOR MSG
      LDA    ES70-1            THERE IS A SUB TO BE EXECUTED
      JMP    QXT
E18B LDA    X18-1              Q CK FOR MSG
      JMP    QXT
E18F PZE
*
*CHECK FOR ERROR MESSAGE.
*
      DAC    X18
X18  PZE
      PZE
      SR4
      JMP    X18B              Q BIT CNTR TASK
      LDA    MSGP
      SNZ
      JMP    X18B              Q BIT CNTR TASK
      LDA    ES65-1            MSG READ
      JMP    QXT
X18B LDA    ES75-1             Q EUS OR EOB CK
      JMP    QXT
*
*READ ERROR MESSAGE FROM DISC.
*
      DAC    ES65
ES65 PZE
      PZE
      LDA    DBYO
      SZE
      JMP    E65B
      LDA    MSGP              MESSAGE POINTER
      JST*   DRO
      DAC    MS28
      DEC    10
      LDA    AX66
      STA    TM                Q NEXT TASK
      LDA    T3
      JMP    QXT
E65B LDA    ES65-1
      JMP    QXT
AX66 DAC    EX66
*
*BUILD ERROR MESSAGE. Q ERROR TYPEOUT.
*
      DAC    ES66
ES66 PZE
      PZE
      LDA    SNM               SER NUM
E66B JST*   AS3                CONV TO ASCII
      STA*   M2A
      IAB
      STA*   M2A+1             STR 2ND 2 DIG OF SERIAL
      LDA    ES31              DSU ADR
      SUB    =1
      LGL    1
      ADD    DDD
      STA    E66F
      LDA*   E66F
      IRS    E66F
      STA*   M2D               2 MSD DSU ID TO MSG
      LDA*   E66F
      STA*   M2D+1             LSD DSU ID TO MSG
      LDA    BP                BIT POSITION
      JST*   AS3
      STA*   M2E               2MSG BIT POS TO MSG
      IAB
      STA*   M2E+1             LST BIT POS TO MSG
      LDA    TD1-1             Q CK FOR TIME/DATE TYPE OUT
      JMP    QXT
E66F PZE
DDD  DAC    D1DD
*
*CHECK FOR TIME AND DATE TYPEOUT.
*
      DAC    TD1
TD1  PZE
      PZE
      LDA    CH1               SET WHEN T/D HAVE BEEN TYPED
      SNZ
      JMP    TD1C
```

```
     LDA   ES67-1            Q NEXT TASK
     JMP   QXT
TD1C LDA   TD2-1             Q T/D TYPEOUT
     JMP   QXT
*
*TYPE OUT TIME AND DATE.
*
     DAC   TD2
TD2  PZE
     PZE
     SR4
     JMP   TD2C              DO NOT TUPE
     LDA   BUSY
     SZE
     JMP   TD2D
TD2A JST*  TYPP
     DAC   MS2               TIME AND DATE
     DEC   9
     IRS   CH1               SET T/D TYPED FLAG
     IRS   ASRB
     LDA   ES67-1
     STA   TMM
     LDA   E68               Q WAIT FOR TYPEOUT
     JMP   QXT
TD2C LDA   ES75-1
     JMP   QXT
TD2D LDA   ASRB
     SZE
     JMP   TD2A
     LDA   TD2-1             RE-Q
     JMP   QXT
*
*TYPE OUT ERR MESSAGE.
*
     DAC   ES67
ES67 PZE
     PZE
     SR4
     JMP   E67C
     LDA   BUSY
     SZE
     JMP   E67D
E67A JST*  TYPP
     DAC   MS2A
     DEC   21
     IRS   ASRB
     LDA   ES75-1
     STA   TMM
     LDA   ES68-1
     JMP   QXT
E67C LDA   ES75-1            Q SHIFT ROUTINE
     JMP   QXT
E67D LDA   ASRB
     SZE
     JMP   E67A
     LDA   ES67-1            RE-Q
     JMP   QXT
*
*CHECK BUSY TYPING.
*
     DAC   ES68
ES68 PZE
     PZE
     LDA   TTOF
     SZE
     JMP   E68B              RE-Q
     LDA   TMM
     JMP   QXT
E68B LDA   ES68-1            RE-Q
     JMP   QXT
*
*READ SUBROUTINE FROM DISC
*
     DAC   ES70
ES70 PZE
     PZE
     LDA   DBYO
     SZE
     JMP   E70C              RE-Q
     LDA   SUBP              SUB PTR
     JST*  DRD               READ IN SUB FROM DISC
     DAC   SUBF
     DEC   128
     LDA   SUBX              Q SUB TO BE EXECUTED
     STA   TM
     LDA   T3
     JMP   QXT
E70C LDA   ES70-1            RE-Q
     JMP   QXT
*
*CHECK FOR EOS OR EOB.
*
```

```
      DAC    ES75
ES75  PZE
      PZE
      LDA    ESCN              EOS PROCESS FLAG
      SZE
      JMP    E75C              EOS
      LDA    E75F
      JMP    QXT
E75C  LDA    E15-1             Q BIT INCR
      JMP    QXT
E75F  DAC    BE15
      FIN
      ORG    '46000
DA    BSS    16                WORK AREA BUFFER
CIAV  PZE                      CURRENT INPUT ACCESS VEC
PIAV  PZE                      PREV INPUT ACCESS VEC
CS    PZE                      CURRENT INPUT SHIFT VALUE
PS    PZE                      PREVIOUS INPT SHIFT VALUE
ERA   PZE                      ERA VALUE OF PREV AND CURRENT
*
*READ PREVIOUS DATA FROM DISC.
*
      DAC    BE7
BE7   PZE
      PZE
      LDA    DBYO
      SZE
      JMP    B7B               RE-Q
      LDA    DSCA              DISC ADR
      JST*   DRO               CALL DISC READ
      DAC    DA
      DEC    16
      LDA    BE8-1             Q NEXT TASK
      STA    TH
      LDA    T3
      JMP    QXT
B7B   LDA    BE7-1
      JMP    QXT
*
*BLOCK END INITIALIZE, Q WRITE CURRENT DATA
*
      DAC    BE8
BE8   PZE
      PZE
      CRA
      STA    WNUM              CLR WRD NUM
      STA    NORM              SET NORMAL FLAG TO OPEN
      STA    ESCN
      LDA    =-16
      STA    CT11              SET WRD CTR
      LDA    BF1               CURRENT INPT BUF ADR
      ADD    =1
      STA    CIAV              SET CUR INP ACCESS VEC
      LDA    DWA
      STA    PIAV              SET PREV INP ACCESS VEC
      LDA    BE9-1             WRITE CURRENT DATA ON DISC
      STA    DRD               Q IF DISC PARITY
      JMP    QXT
*
*WRITE CURRENT DATA ON DISC.
*
      DAC    BE9
BE9   PZE
      PZE
      LDA    DBYO
      SZE
      JMP    B9B               RE-Q
      LDA    DSCA
      JST*   DWO
      DAC    BFF1+1
      DEC    16
      LDA    BE10-1            Q NEXT TASK
      STA    TH
      LDA    T3                Q DISC READY CHECK
      JMP    QXT
B9B   LDA    BE9-1             RE-Q THIS TASK
      JMP    QXT
*
*COMPARE PREVIOUS WORD TO CURRENT WORD.
*
      DAC    BE10
BE10  PZE
      PZE
      LDA*   CIAV              CURRENT WORD
      CAS*   PIAV
      JMP    B10C              NOT EQUAL
      JMP    *+2
      JMP    B10C
B10B  LDA    BE11-1            Q WRD INCR
      JMP    QXT
B10C  ERA*   PIAV
      ARR    1
```

```
      STA    ERA
      CRA
      STA    BNUM              CLR BIT NUM
      LDA    =-16
      STA    BCTR              SET BIT SHIFT CNTR
      IRS    CH2               CHNG HAS OCCURRED THIS DSU
      IRS    CHNG              SET CHNG THIS PASS FLAG
      LDA    BE12-1            Q NEXT TASK
      JMP    QXT
*
*INCREMENT WORD COUNTER, CHECK FOR ZERO.
*
      DAC    BE11
BE11  PZE
      PZE
      IRS    CIAV              INC CUR WRD VEC
      IRS    PIAV              INCR PREV WRD ACCESS VEC
      IRS    WNUM
      IRS    C111
      JMP    B11B              RE-Q WORD COMPARE
      LDA    CH2
      SZE                      CHNG OCCURRED THIS DSU
      JST    XFR
      LDA    STAT
      ANA    ='40              ISO EOS BIT
      SZE
      JMP    B11C              EOS ALSO
      JST*   STMM              ALL WRDS CK, RESTART MONITOR
      JMP*   BE11+1
B11B  LDA    BE10-1
      JMP    QXT
B11C  LDA    EOSS              Q EOS PROCESS
      JMP    QXT
*
*XFER CHNGE TO LOG BUFFER.
*
XFR   PZE
      CRA
      STA    CH2
      LDA    =-17
      STA    XF7               SET XFER CNTR
      LDA    DSUA
      STA*   BF1
      LDA    BF1
      STA    XF5               SET ACCESS VEC
XF2   LDA*   XF5
      STA*   LOGV
      IRS    LOGV
      IRS    XF5
      IRS    XF7
      JMP    XF2
      JMP*   XFR
XF5   PZE
XF7   PZE
*
*PROCESS EOB WRD DIFFERENCE.
*
      DAC    BE12
BE12  PZE
      PZE
      LDA*   PIAV
      ARR    1
      STA    PS                SET PREV WRD SHIFT VALUE
      LDA*   CIAV
      STA    CS
      LDA    DSUA
      STA    ES31
      LDA    BE14-1            Q SHIFT ROUTINE
      JMP    QXT
*
*BIT SHIFT AND CHECK FOR CHANGE
*
      DAC    BE14
BE14  PZE
      PZE
      LDA    OFF
      SZE
      JMP*   OFFF
      LDA    PS                BRING PREV INPT TO MATCH ERA POS
      ALR    1
      STA    PS
      LDA    ERA               ERA SHIFT VALUE
      ALR    1
      STA    ERA
      SPL
      JMP    B14C              CHANGE OCCURRED
      LDA    BE15-1            NO CHANGE
      JMP    QXT
B14C  LDA    PS                CHANGE HAS OCCURRED
      SPL                      CK FOR NORMAL OR OPEN CHNG
      JMP    B14E              CHANGED TO NORMAL
      CRA
      STA    NORM
```

```
B14D LDA   BE16-1
     JMP   OXT
B14E IRS   NORM               SET NORMAL FLAG NORMAL
     JMP   B14D
*
*INCR SHIFT COUNTER RE-Q BIT SHIFT OR WORD COMPARE
*
     DAC   BE15
BE15 PZE
     PZE
     IRS   BNUM               INCR BIT NUM
     IRS   BCTR               INCR BIT SHIFT CNTR
     JMP   B15B
     LDA   BE11-1             Q INCR WRD CNTR
     JMP   QXT
B15B LDA   BE14-1             Q SHIFT ROUTINE
     JMP   QXT
*
*COMPUTE BIT POSITION, Q READ OF POINTERS.
*
     DAC   BE16
BE16 PZE
     PZE
     LDA   WNUM               COMPUTE BIT POSITION
     LGL   4                  MPY BY 16
     ADD   BNUM               BIT POS IN A
B16B STA   BP                 STR BIT POS
     LDA   DSUA               DSU ADR
     LGL   5                  MPY BY 32
     ADD   ='10000            BASE TRK 16
     STA   ES32               PTR STRT TRK/SEC THIS DSU
     LDA   E17S
     JMP   QXT
E17S DAC   ES17
     OCT   1
     DEC   4
MS4  BCI   9,SYNC ERR
     OCT   1
     OCT   6
MS5  BCI   9,NO RESPONSE
     OCT   1
     OCT   6
MS6  BCI   9,ABNORMAL EOB
     OCT   1
     DEC   9
MS7  BCI   9,MULT CONC XMITTING
     OCT   1
     DEC   7
MS8  BCI   9,INPUT SWITCHED
     OCT   1
     DEC   10
MS9  BCI   9,ILLEGAL DSU XMISSI
     BCI   1,ON
     DEC   0
     DEC   6
MS20 BCI   9,DISC U PARITY
*
*CONVERT 3 DIGIT BINARY TO ASCII.
*
ASC  PZE
     STA   AC5                SAVE BIN NUM
     IAB
     CRA
     DIV   =10
     IAB
     ICA                      INTERCH A
     ADD   ='130240
     STA   AC7                LSD ASCII, SPAVE
     CRA
     DIV   =10
     LGL   8
     STA   AC6
     IAB
     ADD   AC6
     ADD   ='130260
     STA   AC6
     LDA   AC7
     IAB                      LSD TO B
     LDA   AC6                2 MSD TO A
     JMP*  ASC
AC5  PZE
AC6  PZE
AC7  PZE
*
*CHECK FOR DISC PARITY.
*
DP   PZE
     PZE
     SKS   '621               SKP PARITY ERR NOT DETECTED
     JMP   DP3
     LDA   =-10
     STA   DPC                SET DISC PARITY CNTR
     CRA
```

```
     STA   DBYO              CLR DISC BUSY FLAG
     LDA   TM                Q NEXT TASK
     JMP   QXT
DP3  CHA
     STA   DBYO
     IRS   DPC               INCR DISC PARITY CNTR
     JMP   DP5
     LDA   =-10
     STA   DPC               SET DIAC PARITY CNTR
     LDA   DPT-1             Q DISC PARITY TYPE OUT
     JMP   QXT
DP5  LDA   DRD               RE-Q THIS DISC READ
     JMP   QXT
*
*TYPE DISC PARITY.
*
     DAC   DPT
DPT  PZE
     PZE
     LDA   BUSY
     SZE
     JMP   DPT5              RE-Q
DPT1 JST*  TYPP
     DAC   MS20              DISC PARITY
     DEC   9
     IRS   ASRB
     LDA   SCND-1            Q MON RESET AND RESTART
     STA   TMM
     LDA   E66               Q WAIT FOR TYPE OUT
     JMP   QXT
DPT5 LDA   ASRB
     SZE
     JMP   DPT1
     LDA   DPT-1
     JMP   QXT
*
*DUMMY TASK.
*
     DAC   DUMY
DUMY PZE
     PZE
     CRA
     STA   BUSY
     STA   ASRB
     JMP*  DUMY+1
*
*CHECK FOR LOCATION OF SRIAL NUMBER.
*
     DAC   EX66
EX66 PZE
     PZE
     LDA   NORM
     SZE
     JMP   X66G              CHANGE TO NORMAL
     LDA   SNUM              CHNGE TO OPEN
     CAS   =999
     HLT                     NEVER EXECUTED
     JMP   X66F
     IRS   SNUM
X66A STA   SNM               STR WORKING SER NUM
     LDA   OP
     STA*  M2C
     LDA   X76-1
     STA   TM
     LDA   EX67-1
     JMP   QXT
X66F CHA
     STA   SNUM              SET SER NUM TO Z
     LDA   =999
     JMP   X66A
X66G LDA   NL
     STA*  M2C
     LDA   EX68-1
     STA   TM
     LDA   EX67-1            Q SER NUM READ
     JMP   QXT
*
*SERIAL NUMBER READ.
*
     DAC   EX67
EX67 PZE
     PZE
     LDA   DBYO
     SZE
     JMP   X67F              RE-Q
     LDA   EX67-1
     STA   DRD
     LDA   ES31              DSU ADR
     LGL   4
     ADD   ='22400           BASE TRK 37
     STA   DSCA
     JST*  DRD
     DAC   SERB              SER NUM BUF
```

```
      DEC    256
      LDA    T3              DISC READY CK
      JMP    QXT
X67F  LDA    EX67-1          RE-Q
      JMP    QXT
*
*GET SERIAL NUMBER AFTER READ.
*
      DAC    EX68
EX68  PZE
      PZE
      LDA    BP              BIT POSITION
      ADD    SRB
      STA    X68D
      LDA*   X68D            SER NUM
      STA    SNM
      LDA    XX66            Q NEXT TASK
      JMP    QXT
X68D  PZE
SRB   DAC    SERB
XX66  DAC    ES66
*
*CHANGE SERIAL NUMBER.
*
      DAC    X76
X76   PZE
      PZE
      LDA    BP              BIT POSITION
      ADD    SRB             COMPUTE SER NUM ADR
      STA    X68D
      LDA    SNM             NEW SER NUM
      STA*   X68D
      LDA    XX66            Q MSG BUILD
      STA    TM
      LDA    X77-1           Q SER NUM WRITE
      JMP    QXT
*
*WRITE SERIAL NUMBERS ON DISC THIS DSU.
*
      DAC    X77
X77   PZE
      PZE
      LDA    DBYD
      SZE
      JMP    X77F            RE-Q
      LDA    X77-1
      STA    DBD
      LDA    DSCA
      JST*   DWD
      DAC    SERB            SERIAL NUM BUF
      DEC    256
      LDA    XX66            Q  MSG BUILD
      STA    TM
      LDA    T3              Q DISC BUSY CK
      JMP    QXT
X77F  LDA    X77-1           RE-Q
      JMP    QXT
*
*WAIT FOR LOGGING.
*
LCK   PZE
      PZE
      LDA    LOGF
      SZE
      JMP    LC5             RE-Q
      LDA    TMMM            Q INIT.RESTART
      JMP    QXT
LC5   LDA    LCKA            RE-Q
      JMP    QXT
*
*INITIALIZE FLAGS.GET TIME.RESET AND START SCANNER.
*
      DAC    SCND
SCND  PZE
      PZE
      LDA    ASRB
      SZE
      JMP    SD5
SD3   JST*   GT              GET TIEM.INIT OUT BUF VEC
      JST*   RSET            RESET SCNR TO 1ST ADR
      JST*   STMM            RESTART MONITOR
      JMP*   SCND+1
SD5   CRA
      STA    BUSY
      JMP    SD3
*
*Q MONITOR OFF ROUTINE.
*
OF    LDA    DMM
      JMP    QXT
      FIN
*
```

```
*SET MONITOR OFF FLAG.
*
      ORG    '46742
SOFF  PZE
      PZE
      IRS    OFF
      JMP*   SOFF+1
*
*DISABLE MONITOR.
*
DM    PZE
      PZE
      INH
      LDA    PINK
      ANA    ='175777
      STA    PINK
      OTA    '120
      ENB
      CRA
      STA    ON
      JST*   TYPP
      DAC    MS33                MONITOR OFF
      DEC    6
      LDA    DUMY-1              O CLR BUSY
      STA    TMM
      LDA    E68                 O WAIT FOR TYPE OUT
      JMP    OXT
DMM   DAC    DM
MS33  BCI    6,MONITOR OFF
      FIN
      ORG    '40000
      OCT    2
      DEC    0                   LOADED BY OUTPUT LOG PROGRAM
LGBB  BSS    1705                MONITOR LOG BUFFER
      PZE
*
*DSU ID TABLE.
*
      ORG    '47400
DUID  BCI    8,DS1 DS2 DS3 DS4
      BCI    8,DS5 DS6 DS7 DS8
      BCI    8,DS9 D10 D11 D12
      BCI    8,D13 D14 D15 D16
      BCI    8,D17 D18 D19 D20
      BCI    8,D21 D22 D23 D24
      BCI    8,D25 D26 D27 D28
      BCI    8,D29 D30 D31 D32
      BCI    8,D33 D34 D35 D36
      BCI    8,D37 D38 D39 D40
      BCI    8,D41 D42 D43 D44
      BCI    8,D45 D46 D47 D48
      BCI    8,D49 D50 D51 D52
      BCI    8,D53 D54 D55 D56
      BCI    8,D57 D58 D59 D60
      BCI    8,D61 D62 D63 D64
      BCI    8,D65 D66 D67 D68
      BCI    8,D69 D70 D71 D72
      BCI    8,D73 D74 D75 D76
      BCI    8,D77 D78 D79 D80
      BCI    8,D81 D82 D83 D84
      BCI    8,D85 D86 D87 D88
      BCI    8,D89 D90 D91 D92
      BCI    8,D93 D94 D95 D96
      BCI    8,D97 D98 D99 100
      END
```

We claim:

1. In a system for monitoring the status of discrete devices and transmitting status information to an external computer, the combination comprising:

a. a group of said discrete devices, each of said discrete devices being in (1) a normal state, or (2) an off-normal state;

b. means for generating an interrogation signal for initiating a determination of said states of said devices;

c. scanning means coupled to said generating means to receive said interrogation signal, said scanning means for scanning said states of all of said discrete devices in said group simultaneously, said scanning means including means for generating a first response signal dependent on said states of said discrete devices in said group;

d. means responsive to said first response signal for scanning each of said discrete devices individually when at least one of said devices in said group is in said off-normal state; and e. means responsive to said individual scanning means for generating a second response signal to said computer in accordance with said state of each of said devices in said group only when at least one of said devices in said group is in said off-normal state, said computer for outputting predetermined signals to said discrete devices for control thereof responsive to said second response signal generation.

2. The system of claim 1, wherein said interrogation signal generation means comprises counter means for generating an address signal unique to said group of discrete devices.

3. The system of claim 2, wherein said interrogation signal generation means further comprises means for altering the contents of said counter means.

4. The system of claim 3, wherein said altering means comprises means for incrementing the count in said counter means by one count following each complete scan by said scanning means.

5. The system of claim 2, further comprising means for comparing the generated address signal with a portion of the first response signal.

6. The system of claim 5 wherein said comparing means comprises status detection means, said comparing means having means for enabling said status detection means subsequent to the occurrence of a predetermined comparison between said generated address signal and said portion of said first response signal.

7. The system of claim 1, wherein said scanning means comprises address detector means for generating a signal identifying a particular scanning means having said first response signal transmitted thereto.

8. The system of claim 7, wherein said scanning means comprises:

a. bit sensor means for generating a signal in accordance with whether any of said devices are in said off-normal state or whether all of said devices are in said normal state; and, b. status scanning means for forming said first response signal from said signal from said address detector means and said signal from said bit sensor means.

9. The system of claim 8, wherein said scanning means further comprises second counter means for generating pulses for scanning the state of each of said devices.

10. The system of claim 1, further comprising:

a. at least one additional group of said discrete devices;

b. first counter means for generating an address signal unique to at least one of said groups of said discrete devices;

c. means for altering the contents of said counter means subsequent to a scan by said simultaneous scanning means, said scanning means further including, d. scanner gating means for generating a signal in accordance with the address of said scanning means;

e. bit sensor means for generating a signal in accordance with whether any of said devices are in said off-normal state or whether all of said devices are in said normal state; and, f. status scanning means for forming said first response signal from said signal from said scanner gating means and said signal from said bit sensor means.

11. The system of claim 10, wherein said scanning means further comprises second counter means for generating pulses for scanning the state of each of said devices.

12. In a system for monitoring the status of discrete devices and transmitting status information to an external computer, the combination comprising:

a. a plurality of groups of discrete devices, each of said groups comprised of a plurality of said devices, each of said discrete devices being in (1) a normal state, or (2) an off-normal state;

b. counter means for generating an interrogation signal for initiating a determination of said states of said devices in one of said groups;

c. means for altering the count in said counter means following each group state determination, said altering means including sensor means connected to receive said interrogation siganl for developing a first response signal indicating whether all of said devices in a group are in said normal state or if any of said devices in said group are in said off-normal state;

d. scan control means connected to receive said control signal for sequentially scanning the status of each of said discrete devices in a group when said first response signal indicates that at least one of said devices is in said off-normal state and for developing a second response signal in accordance with said state of each of said devices in said group, said second response signal being transmitted to said external computer, said computer for outputting predetermined signals to said discrete devices for control thereof responsive to said second response signal; and e. sequencing means responsive to said interrogation signal from said counter means for operating on a further group of discrete devices.

13. The system of claim 12, further comprising means for passing said second response signal to said computer under control of said first response signal.

* * * * *